US009398188B2

(12) United States Patent
Yoshida et al.

(10) Patent No.: US 9,398,188 B2
(45) Date of Patent: Jul. 19, 2016

(54) PRINTING CONTROL SYSTEM, PRINTING CONTROL METHOD, AND CONTROL DEVICE OF MULTIFUNCTIONAL PORTABLE TERMINAL

(71) Applicants: DAI NIPPON PRINTING CO., LTD., Tokyo (JP); DNP IMS AMERICA CORPORATION, Concord, NC (US)

(72) Inventors: Jun Yoshida, Tokyo (JP); David Oles, Concord, NC (US)

(73) Assignees: Dai Nippon Printing Co., Ltd., Shinjuku-Ku (JP); DNP Imagingcomm America Corporation, Concord, NC (US)

(*) Notice: Subject to any disclaimer, the term of this patent is extended or adjusted under 35 U.S.C. 154(b) by 0 days.

(21) Appl. No.: 14/026,078

(22) Filed: Sep. 13, 2013

(65) Prior Publication Data

US 2014/0085652 A1 Mar. 27, 2014

Related U.S. Application Data

(60) Provisional application No. 61/701,115, filed on Sep. 14, 2012.

(51) Int. Cl.
*G06F 3/12* (2006.01)
*H04N 1/32* (2006.01)
*H04N 1/00* (2006.01)
*H04N 1/44* (2006.01)

(52) U.S. Cl.
CPC .......... *H04N 1/32005* (2013.01); *G06F 3/1211* (2013.01); *G06F 3/1239* (2013.01); *G06F 3/1292* (2013.01); *H04N 1/00228* (2013.01); *H04N 1/00233* (2013.01); *H04N 1/444* (2013.01); *H04N 1/4426* (2013.01); *H04N 1/4433* (2013.01); *H04N 2201/0062* (2013.01); *H04N 2201/0082* (2013.01)

(58) Field of Classification Search
USPC .......................................... 358/1.13, 1.15, 1.1
See application file for complete search history.

(56) References Cited

U.S. PATENT DOCUMENTS

| 2001/0017652 | A1 | 8/2001 | Sato | |
| 2004/0013415 | A1* | 1/2004 | Ishiguchi | ...................... 386/125 |

(Continued)

FOREIGN PATENT DOCUMENTS

| EP | 1 739 624 A2 | 1/2007 |
| JP | 2001-197407 A1 | 7/2001 |
| JP | 2007-122520 A1 | 5/2007 |

OTHER PUBLICATIONS

Extended European Search Report (Application No. 13836544.0) dated Jan. 8, 2016.

*Primary Examiner* — Martin Mushambo
(74) *Attorney, Agent, or Firm* — Burr & Brown, PLLC

(57) ABSTRACT

To provide a printing control system capable of efficiently utilizing a printer installed in an event hall or the like. A printing control system includes a printing management unit capable of generating a printing command for causing a printer to print an image received from a multifunctional portable terminal. The printing management unit is configured to exclude, when a creation date and time of the received image is out of a predetermined printable period, the received image from an item to be printed, or to exclude, when the number of received images is out of a predetermined printable number, at least a part of the received images, which exceeds the printable number, from an item to be printed.

20 Claims, 27 Drawing Sheets

(56) References Cited

U.S. PATENT DOCUMENTS

| | | | |
|---|---|---|---|
| 2005/0097052 A1* | 5/2005 | Systa et al. | 705/51 |
| 2006/0082654 A1 | 4/2006 | Sato | |
| 2006/0283933 A1* | 12/2006 | Ueda et al. | 235/375 |
| 2009/0080929 A1* | 3/2009 | Kim | 399/79 |
| 2009/0225356 A1* | 9/2009 | Satoh et al. | 358/1.15 |
| 2009/0315904 A1* | 12/2009 | Sugimoto et al. | 345/531 |
| 2011/0096359 A1 | 4/2011 | Taniuchi | |
| 2011/0102826 A1* | 5/2011 | Fujiwara et al. | 358/1.13 |
| 2011/0299114 A1* | 12/2011 | Nishimaki | 358/1.15 |

* cited by examiner

PRINTING CONTROL SYSTEM, PRINTING CONTROL METHOD, AND CONTROL DEVICE OF MULTIFUNCTIONAL PORTABLE TERMINAL

BACKGROUND OF THE INVENTION

1. Field of the Invention

The present invention relates to a printing control system and a printing control method for properly printing an image transmitted from a multifunctional portable terminal. In addition, the present invention relates to a control device of a multifunctional portable terminal.

2. Description of Related Art

In order to print an image taken by a digital camera, one can bring a recording medium, such as an SD card, which records an image, into a printing shop and place an order for printing the image, or one can print the image by a printer in his/her home. On the other hand, when an image is taken in a certain event, the image is desired to be printed then and there, in order that a plurality of participants in the event can share the image, for example. In order to cope with this demand, Patent Document 1 has proposed a photograph service system to be installed in an event hall, for example. The photograph service system includes a printer configured to print an image that has been wirelessly transmitted from a digital camera.

Patent Document: JP2001-197407A

SUMMARY OF THE INVENTION

In recent years, multifunctional portable terminals having both a photographing function and a communication function, such as smart phones and digital cameras having a communication device, have become widely used. Thus, in an event such as a wedding ceremony in which a lot of people participate, it is expected that the number of images transmitted from the multifunctional portable terminal of each of the participants to a printer is significantly large. In this case, when all of these images are sequentially printed by the printer, there is a possibility that a participant has to wait for a long time before he/she receives the printed image.

The object of the present is to provide a printing control system, a printing control method, and a control device for a multifunctional portable terminal which are capable of efficiently solving such a problem.

A first aspect of the present invention is a printing control system communicably connected to a multifunctional portable terminal, the printing control system being configured to generate a printing command to a printer, the printing control system comprising: a communication device configured to receive an image transmitted from the multifunctional portable terminal; a recording device configured to record the image received by the communication device as a received image; and a control device including a printing management unit capable of generating a printing command for causing the printer to print the received image; wherein the printing management unit of the control device is configured to exclude, when a creation date and time of the received image is out of a predetermined printable period, the received image from an item to be printed, or to exclude, when the number of received images is out of a predetermined printable number, at least a part of the received images, which exceeds the printable number, from an item to be printed.

According to the printing control system of the present invention, a property or the number of images to be printed by a printer, which have been transmitted from multifunctional portable terminals of participants, can be restricted. Thus, a printer installed in, e.g., an event hall can be efficiently utilized.

In the printing control system of the present invention, the printing management unit may include a printable-period setting unit configured to set the printable period, and the printing management unit may be configured to exclude, when a creation date and time of the received image is out of the printable period of the printable-period setting unit, the received image from an item to be printed.

In the printing control system of the present invention, the printing management unit may include a printable-number setting unit configured to set the printable number, and the printing management unit may be configured to exclude, when the number of received images is out of the printable number of the printable-number setting unit, at least a part of the received images, which exceeds the printable number, from an item to be printed.

In the printing control system of the present invention, the printing management unit may include an available-period setting unit configured to set an available period during which the printer can be used, and the printing management unit may be configured to exclude, when a current time is out of the available period of the available-period setting unit, the received image from an item to be printed.

In the printing control system of the present invention, the printing management unit may further include a frequency-in-use information management unit configured to manage frequency-in-use information relating to a frequency at which the multifunctional portable terminal uses the printer, and a priority determination unit configured to determine ordering of priority in printing of images from multifunctional portable terminals depending on the frequency-in-use information.

In the printing control system of the present invention, when the frequency-in-use information of the multifunctional portable terminal is out of a predetermined allowable frequency, the priority determination unit of the printing management unit may be configured to lower the ordering of priority in printing of the received image from this multifunctional portable terminal.

In the printing control system of the present invention, the priority determination unit of the printing management unit may be configured to compare frequency-in-use information of a certain multifunctional portable terminal with frequency-in-use information of another multifunctional portable terminal, so as to determine ordering of priority in printing of received images from the respective multifunctional portable terminals.

In the printing control system of the present invention, the control device may further include a processing-condition checking unit configured to obtain processing-condition information relating to a processing condition of the printer, and the processing-condition information may be transmitted to the multifunctional portable terminal.

In the printing control system of the present invention, the control device may further include a composite-image forming unit configured to form a composite image by combining the received image and predetermined format information with each other, and the composite image may be transmitted to the printer.

In the printing control system of the present invention, the composite image may be transmitted to a multifunctional portable terminal which has transmitted the received image based on which the composite image is formed.

In the printing control system of the present invention, the composite-image forming unit may include a general-formatinformation management unit configured to manage general format information capable of being used regardless of a date and time at which the printing control system is operated, and the composite-image forming unit may be capable of forming a composite image by combining the received image and the general format information.

In the printing control system of the present invention, the composite-image forming unit may include a designated-format-information management unit configured to manage designated format information that is set depending on a date and time at which the printing control system is operated, and the composite-image forming unit may be capable of forming a composite image by combining the received image and the designated format information.

In the printing control system of the present invention, the composite-image forming unit may include an optional-format-information management unit configured to manage optional format information that can be combined with the received image or the image, and the optional format information may be disclosed to the multifunctional portable terminal and may be transmitted thereto according to need.

In the printing control system of the present invention, the control device may further include a shared-image management unit configured to set whether the received image that has been transmitted from a certain multifunctional portable terminal and is recorded in the recording device can be disclosed to another multifunctional portable terminal or not.

In the printing control system of the present invention, the control device may further include a designated-information management unit configured to manage designated information that is set depending on a date and time at which the printing control system is operated, and the designated information may be transmitted to the multifunctional portable terminal.

In the printing control system of the present invention, the designated-information management unit may include a time setting unit configured to set a time at which the designated information is transmitted to the multifunctional portable terminal.

In the printing control system of the present invention, the control device may further include a specific-information management unit configured to manage specific information that is transmitted from a certain multifunctional portable terminal and is received by the communication device, and the specific information may be transmitted to another multifunctional portable terminal.

In the printing control system of the present invention, the control device may further include a shared-information management unit configured to manage, as shared information, information peculiar to each multifunctional portable terminal, the information being transmitted from a multifunctional portable terminal whose sharing setup is in force among the multifunctional portable terminals, and configured to disclose the shared information to the multifunctional portable terminal whose sharing setup is in force.

A second aspect of the present invention is a program for causing a computer to function as the aforementioned communication device, the recording device and the control device of the printing control system.

A third aspect of the present invention is a computer-readable recording medium storing the program for causing a computer to function as the aforementioned communication device, the recording device and the control device of the printing control system.

A fourth aspect of the present invention is a printing system comprising: a printer; and a printing control system communicably connected to a multifunctional portable terminal, the printing control system being configured to generate a printing command to the printer; wherein the printing control system includes the aforementioned printing control system.

The printing system of the present invention may further include a display device communicably connected to the printing control system, the display device being configured to sequentially display received images recorded in the printing control system.

In the printing system of the present invention, the display device may be configured to cause the printer to print an image selected through the display device.

A fifth aspect of the present invention is a printing control method for a printing control system communicably connected to a multifunctional portable terminal, the printing control system being configured to generate a printing command to a printer, the printing control method comprising: a receiving step in which an image transmitted from the multifunctional portable terminal is received; a recording step in which the image received in the receiving step is recorded as an received image; and a printing command step in which a printing command for printing the received image by the printer is judged to be generated or not; wherein, in the printing command step, when a creation date and time of the received image is out of a predetermined printable period, the received image is excluded from an item to be printed, or when the number of received images is out of a predetermined printable number, at least a part of the received images, which exceeds the printable number, is excluded from an item to be printed.

According to the printing control method of the present invention, a property or the number of images to be printed by a printer, which have been transmitted from multifunctional portable terminals of participants, can be restricted. Thus, a printer installed in, e.g., an event hall can be efficiently utilized.

The printing control method of the present invention may further include a printable-period setting step in which the printable period is set. In this case, in the printing command step, when a creation date and time of the received image is out of the printable period set in the printable-period setting stage, the received image may be excluded from an item to be printed.

The printing control method of the present invention may further include a printable-number setting step in which the printable number is set. In this case, in the printing command step, when the number of received images is out of the printable number set in the printable-number setting step, at least a part of the received images, which exceeds the printable number, may be excluded from an item to be printed.

The printing control method of the present invention may further include an available-period setting step in which an available period during which the printer can be used is set. In this case, in the printing command step, when a current time is out of the available period set in the available-period setting step, the received image may be excluded from an item to be printed.

The printing control method of the present invention may further include a processing-condition checking step in which processing-condition information relating to a processing condition of the printer is obtained, and the obtained processing-condition information may be transmitted to the multifunctional portable terminal.

A sixth aspect of the present invention is a control device for a multifunctional portable terminal communicably connected to a printing control system configured to generate a printing command to a printer, wherein: the multifunctional portable terminal is capable of selecting an image recorded in a recording device; the control device includes a printing management unit capable of generating a transmission command for transmitting, as a selected image, an image selected from among the images recorded in the recording device, to the printing control system; and the printing management unit is configured to exclude, when a creation date and time of the selected image is out of a predetermined printable period, the selected image from an item to be transmitted, or to exclude, when the number of selected images is out of a predetermined printable number, at least a part of the selected images, which exceeds the printable number, from an item to be transmitted.

According to the control device of a multifunctional portable terminal, a property or the number of images which are transmitted from multifunctional portable terminals of participants, can be restricted. Thus, a printer installed in, e.g., an event hall can be efficiently utilized.

In the control device of a multifunctional portable terminal of the present invention, the printing management unit may include a printable-period management unit configured to manage the printable period, and the printing management unit may be configured to exclude, when a creation date and time of the selected image is out of the printable period of the printable-period management unit, the selected image from an item to be transmitted.

In the control device of a multifunctional portable terminal of the present invention, the printing management unit may further include a printing-condition setting unit configured to set the printable period of the printable-period management unit, based on information transmitted from the printing control system.

In the control device of a multifunctional portable terminal of the present invention, the printing management unit may include a printable-number management unit configured to manage the printable number, and the printing management unit may be configured to exclude, when the number of selected images is out of the printable number of the printable-number management unit, at least a part of the selected images, which exceeds the printable number, from an item to be transmitted.

In the control device of a multifunctional portable terminal of the present invention, the printing management unit may further include a printing-condition setting unit configured to set the printable number of the printable-number management unit, based on information transmitted from the printing control system.

The control device of a multifunctional portable terminal of the present invention may further include the printing management unit may include an available-period management unit configured to manage an available period during which the printer can be used, and the printing management unit may be configured to exclude, when a current time is out of the available period of the available-period management unit, the selected image from an item to be transmitted.

The control device of a multifunctional portable terminal of the present invention may further include a processing-condition checking unit configured to obtain processing-condition information relating to a processing condition of the printer.

The control device of a multifunctional portable terminal of the present invention may further include a composite-image obtaining unit configured to obtain a composite image formed by combining the selected image and predetermined format information.

In the control device of a multifunctional portable terminal of the present invention, the composite image obtaining unit may include a format-information management unit configured to manage the format information, and a composite-image forming unit configured to form the composite image by combining the selected image and the format information with each other.

The control device of a multifunctional portable terminal of the present invention may further include a shared-image obtaining unit configured to obtain an image recorded in the printing control system.

The control device of a multifunctional portable terminal of the present invention may further include a shared-information setting unit configured to set whether information peculiar to the multifunctional portable terminal can be disclosed as shared information to the printing control system or not.

A seventh aspect of the present invention is a program for causing a computer of a multifunctional portable terminal to function as the aforementioned control device for a multifunctional portable terminal.

An eight aspect of the present invention is a computer-readable recording medium storing the program for causing a computer of a multifunctional portable terminal to function as the aforementioned control device for a multifunctional portable terminal.

Effect of the Invention

According to the present invention, a printer installed in an event hall or the like can be efficiently utilized.

DETAILED DESCRIPTION OF THE INVENTION

First Embodiment

A first embodiment of the present invention will be described herebelow with reference to FIGS. 1 to 10. In this embodiment, there is described a system by which each participant of an event can print an image, with the use of his/her multifunctional portable terminal 50, in an event hall such as a wedding ceremony hall. The multifunctional portable terminal 50 herein means a portable terminal having both a photographing function and a communication function, such as a smart phone or a digital camera having a communication device. By using the below-described printing system 1, each participant can print, in the event hall, an image taken in a wedding ceremony hall (event hall) and an image which has been taken before a wedding ceremony (event) in a church, for example.

Printing System

Figure 1:
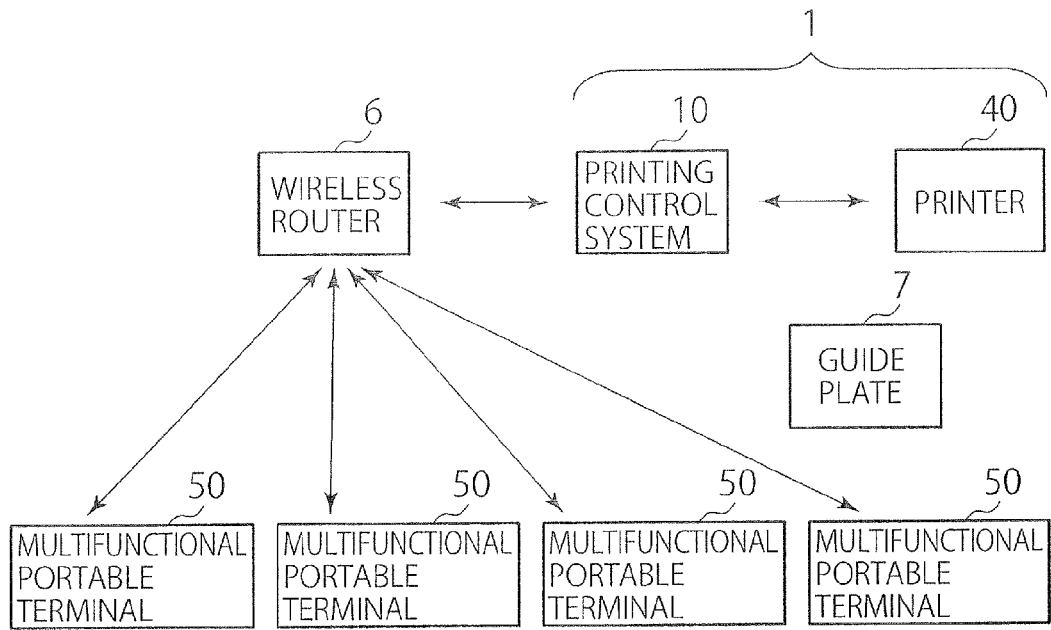
FIG. 1 is a view showing a printing system installed in an event hall, and a plurality of multifunctional portable terminals wirelessly connected to the printing system.

As shown in FIG. 1, installed in the event hall is a printing system 1 including a printer 40 and a printing control system 10 connected to the printer 40 for controlling the printer 40. As long as an image can be printed based on image data, a type of the printer 40 is not particularly limited. For example, the printer 40 may be of any type, such as a printer of a dye-sublimation type, an inkjet printer, a laser printer and so on. The printing control system 10 serves as a so-called printer server for controlling the printer. As the printing control system 10, there is used, e.g., a laptop PC in which a software for controlling the printer 40 is installed. A structure of the printing control system 10 will be described later.

The printing control system 10 can be communicably connected to the plurality of multifunctional portable terminals 50 existing in the event hall in a local area network. For example, as shown in FIG. 1, in the event hall, there is disposed a wireless router 6 for communicably connecting the printing control system 10 and the multifunctional portable terminals 50. A communication method between the wireless router 6 and the printing control system 10 may be either a wireless type or a wired type. Similarly, a communication method between the printing control system 10 and the printer 40 may be either a wireless type or a wired type.

The wireless router 6 may be an apparatus separated from the printing control system 10 or an apparatus integrated with the printing control system 10. For example, when a laptop PC is used as the printing control system 10, the wireless router 6 may be a wireless LAN adapter which is incorporated in the laptop PC in which the printing control system 10 is operated and serves as a wireless LAN base unit. In this case, the function of the wireless router 6 can be achieved by the same laptop PC as the laptop PC in which the printing control system 10 is operated. As a wireless LAN adapter capable of functioning as a wireless LAN base unit, there may be used WLI-UC-GNM2 manufactured by BUFFALO INC., for example.

Printing Control System

Figure 2:
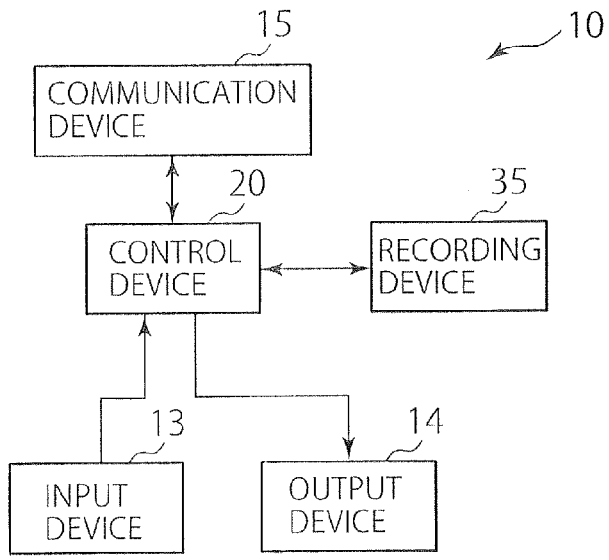
FIG. 2 is a view showing an example of a printing control system of the printing system.

Next, the printing control system 10 is described. As shown in FIG. 2, the printing control system 10 includes a communication device 15, a recording device 35 and a control device 20. The communication device 15 is configured to transmit and receive data to and from an external apparatus. For example, the communication device functions to receive an image transmitted from a multifunctional portable terminal 50 through the wireless router 6. The recording device 35 is configured to record information of an image or the like received by the communication device 15, information inputted through the below-described input device 13, and so on. For example, the recording device 35 is configured to record an image received by the communication device 15. In the following description, an image that has been transmitted from a multifunctional portable terminal 50 and received by the communication device 15 of the printing control system 10 is referred to also as "received image". The term "received image" means either one image or a group of images that have been simultaneously received by the control system 10 from a certain multifunctional portable terminal 50. The recording device 35 may be a nonvolatile recording device for permanently recording a received image, or may be a volatile recording device for temporarily recording a received image. A concrete example of information capable of being recorded in the recording device 35 will be described later.

When the wireless router 6 is an apparatus that is separated from the printing control system 10, the communication device 15 of the printing control system 10 is implemented by an adapter or a module that communicates with the wireless router 6, the adapter or the module being incorporated in the laptop PC constituting the printing control system 10, for example. On the other hand, when the wireless router 6 is an apparatus that is integrated with the printing control system 10, the communication device 15 of the printing control system 10 is implemented by an IC that communicates with the aforementioned wireless LAN adapter, the IC being mounted on a mother board of the laptop PC.

The control device 20 is configured to control information and a command to be transmitted from the printing control system 10 to the printer 40 and the multifunctional portable terminals 50. For example, the control device 20 can generate a printing command for causing the printer 40 to print a received image recorded in the recording device 35.

As described above, when the printing control system 10 is constituted by a laptop PC, as shown in FIG. 2, the printing control system 10 may further include the input device 13 constituted by a keyboard and a mouse of the laptop PC, and an output device 14 constituted by a display unit such as a display panel of the laptop PC. When the laptop PC has a display panel having a touch-panel function, the display panel can serve as the input device 13 and the output device 14.

Control Device of Printing Control System

Figure 3:
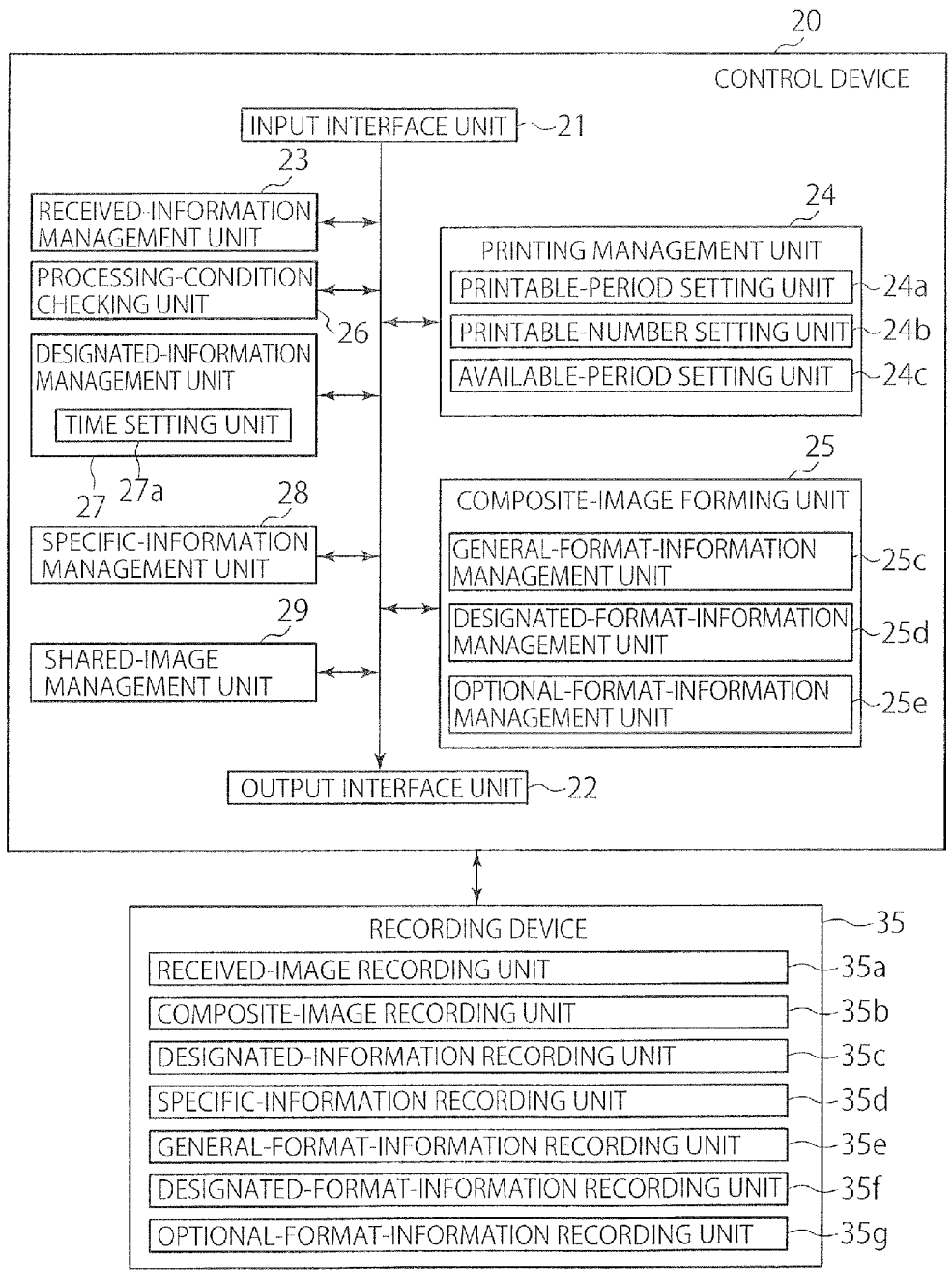
FIG. 3 is a view showing a control device of the printing control system, in a first embodiment of the present invention.

Next, an example of a structure of the control device 20 of the printing control system 10 is described. As shown in FIG. 3, the control device 20 includes an input interface unit 21, an output interface unit 22, a received-information management unit 23, a printing management unit 24 and a composite-image forming unit 25. The input interface unit 21 and the output interface unit 22 are configured to manage input of information from a peripheral device and output of information thereto.

(Received-Information Management Unit)

The received-information management unit 23 is configured to receive information transmitted from an external apparatus and/or a peripheral device and to properly process the information. For example, the received-information management unit 23 receives information such as an image transmitted from a multifunctional portable terminal 50. In addition, the received-information management unit 23 transmits the received information to another constituent element of the control device 20, and records the received information in the recording device 35 connected to the control device 20, according to need. For example, the received-information management unit 23 transmits image information to the recording device 35, such that an image received by the received-information management unit 23 is recorded as a received image in a received-image recording unit 35a of the recording unit 35.

(Printing Management Unit)

The printing management unit 24 is configured to manage a printable period, the number of printable images (a printable number) and an available period. Herebelow, the printable period, the printable number and the available period are described. In an event such as a wedding ceremony in which a lot of people participate, it is expected that the number of images transmitted from the multifunctional portable terminals 50 of the participants to the printing system 1 is significantly large. Thus, when all the images transmitted from the multifunctional portable terminals 50 of the participants to the printing system 1 are printed in order without any condition, there is a possibility that a participant has to wait for a long time before he/she receives a printed image, or that all the images cannot be printed. In addition, the number of printed images and/or the order thereof may be unfair among the participants. In consideration of these circumstances, restrictions are imposed on the printable period, the printable number and the available period in the printing system 1, in this embodiment.

The "printable period" means the restriction on a creation date and time of an image which can be printed. For example, when the printable period is set as "current day", the printing system 1 can print only an image whose creation date is the event day. The "number of printable images (printable number)" means the restriction on the number of images that can be simultaneously printed by a certain participant. For example, when the printable number is set as "three", the printing system 1 can print three images from among a plurality of images simultaneously transmitted from a certain participant. The "available period" means a time when a participant can use the printer 40 of the printing system 1. For example, when the available period is set as "10 o'clock to 12 o'clock", the printing system 1 can print only an image that is received from 10 o'clock to 12 o'clock.

The "creation date and time" in the above-described printable period is a date and time at which an image was created. For example, the creation date and time may be a date and time at which an image was taken. Alternatively, the creation date and time may be a recording date and time at which an image was recorded in the recording device 52 of the multifunctional portable terminal 50, or an update date and time at which an image was updated. For example, as described below, when an image and optional format information are combined with each other to form a composite image in a multifunctional portable terminal 50, and the composite image is transmitted to the printing control system 10, the creation date and time may be a date and time at which the composite image was formed.

As shown in FIG. 3, the printing management unit 24 includes a printable-period setting unit 24a for setting a printable period, a printable-number setting unit 24b for setting a printable number, and an available-period setting unit 24c for setting an available period of the printing system 1. Setting operations by the respective setting units 24a, 24b and 24c are performed based on, e.g., information that has been inputted by an event manager to the printing control system 10 through the input device 13. Information relating to the set printable period, the set printable number and the set available period may be recorded in the respective setting units 24a, 24b and 24c, or may be recorded in the recording device 35.

(Composite-Image Forming Unit)

As shown in FIG. 3, the control device 20 may further include the composite-image forming unit 25 configured to form a composite image by combining a received image and predetermined format information with each other. The format information means information relating to a character, a pattern, a logotype, a frame or the like, which can be combined with an image. A composite image formed by the composite-image forming unit 25 is recorded in, e.g., a composite-image recording unit 35b of the recording device 35.

The composite-image forming unit 25 may include a general-format-information management unit 25c configured to manage general format information. In this case, the composite-image forming unit 25 can form a first composite image, which will be described later, by combining an image and general format information with each other. The "general format information" herein means format information which can be used regardless of a date and time at which the printing control system 10 is operated. For example, the general format information includes information relating to a frame suited for a wedding ceremony picture, which is to be drawn along an edge of a picture.

In addition, the composite-image forming unit 25 may include a designated-format-information management unit 25*d*. In this case, the composite-image forming unit 25 can form a second composite image, which will be described later, by combining an image and designated format information with each other. The "designated format information" herein means format information which is set depending on a date and time at which the printing control system 10 is operated. For example, when the printing control system 10 is operated in a predetermined event hall on xx (month). xx (day). 2012, the designated format information includes information relating to contents of the event carried out in the event hall on xx. xx. 2012, and a logotype of the event hall.

The composite-image forming unit 25 may include an optional-format-information management unit 25*e* configured to manage optional format information. The "optional format information" means format information as a material by which a participant can optionally process an image by using a multifunctional portable terminal 50. For example, the optional format information includes patterns such as a heart mark and a star mark. The optional format information managed by the optional-format-information management unit 25*e* is disclosed to the multifunctional portable terminals 50, and is transmitted thereto according to need.

As shown in FIG. 3, the respective format information managed by the respective setting units 25*c*, 25*d* and 25*e* of the composite-image forming unit 25 may be respectively recorded in a general-format-information recording unit 35*e* of the recording device 35, a designated-format-information recording unit 35*f* thereof, and an optional-format-information recording unit 35*g* thereof.

(Processing-Condition Checking Unit)

As shown in FIG. 3, the control device 20 may further include a processing-condition checking unit 26 configured to obtain processing-condition information relating to a processing condition of the printer 40. By using the processing-condition checking unit 26, the number of images waiting for being printed can be checked, for example. The obtained processing-condition information may be transmitted to the multifunctional portable terminals 50 through the output interface unit 22 and the communication device 15.

The concrete method by which the processing-condition checking unit 26 obtains processing-condition information is not particularly limited. For example, information announcing completion of printing and information announcing error in printing are sequentially transmitted from the printer 40 to the printing control system 10 and the information are recorded in the printing control system 10, the processing-condition checking unit 26 may obtain processing-condition information by referring to the record of the information. Alternatively, when the printer 40 is provided with a recording device, not shown, and information announcing completion of printing and information announcing error in printing are recorded in this recording device, the processing-condition checking unit 26 may obtain processing-condition information by referring to the recording device of the printer 40.

(Designated-Information Management Unit)

In addition, as shown in FIG. 3, the control device 20 may further include a designated-information management unit 27 configured to manage designated information. The "designated information" means information which is set depending on a date and time at which the printing control system 10 is operated. When the printing control system 10 is operated in a predetermined event hall on xx (month). xx (day). 2012, the designated information includes information relating to contents of the event carried out in the event hall on xx (month). xx (day). 2012. Such designated information may be recorded in a designated-information recording unit 35*c* of the recording device 35. The designated information managed by the designated-information management unit 27 may be transmitted to a multifunctional portable terminal 50 through the output interface unit 22 and the communication device 15.

In addition, the designated-information management unit 27 may include a time setting unit 27*a* configured to set a time at which the above-described designated information is transmitted to the multifunctional portable terminals 50. Thus, the designated information can be transmitted to the multifunctional portable terminals 50 at a desired time. When such a time setting unit 27*a* is not provided or when a time is not set in the time setting unit 27*a*, the designated-information management unit 27 may transmit designated information to the multifunctional portable terminals 50 at a preset timing. For example, when connection between a multifunctional portable terminal 50 and the printing control system 10 is started, the designated-information management unit 27 may transmit designated information to the multifunctional portable terminal 50. In addition, the designated-information management unit 27 may designated information of plural kinds, such as first designated information transmitted to a multifunctional portable terminal 50 when connection between the multifunctional portable terminal 50 and the printing control system 10 is started, and second designated information transmitted to a multifunctional portable terminal 50 at a time set by the time setting unit 27*a*.

(Specific-Information Management Unit)

In addition, as shown in FIG. 3, the control device 20 may further include a specific-information management unit 28 configured to manage specific information. The "specific information" means information which is desired to be transmitted by a certain event participant to other participants, and information which is desired to be shared by the other participant. For example, the specific information includes a massage of an event participant who desires that the message is transmitted to other participants. The specific information, which has been transmitted from a multifunctional portable terminal 50 of a certain participant to reach the designated-information management unit 28 through the communication device 15, the input interface unit 21 and the received-information management unit 23, is transmitted to the multifunctional portable terminals 50 of the other participants through the output interface unit 22 and the communication device 15. The specific information having reached the specific-information management unit 28 may be recorded in a specific-information recording unit 35*d* of the recording device 35, before or after the specific information is transmitted toward the other multifunctional portable terminals 50.

(Shared-Image Management Unit)

There are limits on the number and kind of images that can be taken by a certain participant during an event. Thus, some participants may hope to see or print an image taken by another participant. According to this embodiment, the printing control system 10 records, as received images, images transmitted from a plurality of multifunctional portable terminals 50. The control device 20 of the printing control system 10 may further include a shared-image management unit 29 configured to set whether such received images can be disclosed to the multifunctional portable terminals 50. For example, the shared-image management unit 29 can set whether a received image, which has been transmitted from a certain multifunctional portable terminal 50 and recorded in the recording device 35, can be disclosed to the other multifunctional portable terminals 50. The recording device in which an image to be disclosed to the multifunctional portable terminals 50, and the recording device in which an image is recorded when the aforementioned printing management unit 24 judges whether a restriction on printing is performed or not, may be devices separated from each other. For example, the recording device in which an image to be disclosed to the multifunctional portable terminals 50 may be a nonvolatile recording device for permanently recording an image. On the other hand, the recording device in which an image is recorded when the printing management unit 24 judges whether a restriction on printing is performed or not may be a volatile recording device for temporarily recording an image.

In terms of privacy, it is generally preferable that an image transmitted from a certain multifunctional portable terminal 50 is not disclosed to the other multifunctional portable terminals 50. However, an image taken in an event may be a memory shared by participants in the event, and such an image can be regarded as a shared property of the respective participants. Thus, it may be appropriate that an image is disclosed to the event participants in a restricted manner. In consideration of these points, whether the shared-image management unit 29 is turned on (an image is shared) or off (an image is not shared) is suitably determined. According to this embodiment, as described above, there is provided the printable-period setting unit 24a including information relating to a restriction on a creation date and time of an image. In this case, by suitably utilizing the printable-period setting unit 24a, a creation date and time of an image to be recorded in the recording device 35 can be restricted. For example, it is possible to set a condition such that only images taken on the event day are recorded in the recording device 35. Thus, an image irrelevant to the event can be prevented from being disclosed to the respective participants.

Program for Printing Control System

The printing control system 10 is constituted by installing a program in a computer such as a laptop PC, the program for causing the computer to function as the aforementioned communication device 15, the recording device 35 and the control device 20. The program may be previously installed in the computer upon shipment of the computer. Alternatively, the program may be installed in the computer after shipment of the computer, with the use of a recording medium storing the program, which is readable by the computer. The type of the recording medium is not particularly limited. The recording medium may be a portable recording medium such as a magnetic disc or an optical disc, a fixed-type recording medium such as a hard disc device or a memory, and so on. The program may be distributed through a communication line such as an Internet. When the program is distributed through a communication line, a recording medium storing the program according to this embodiment is present at least temporarily, in a server for distribution.

Multifunctional Portable Terminal

Figure 4:
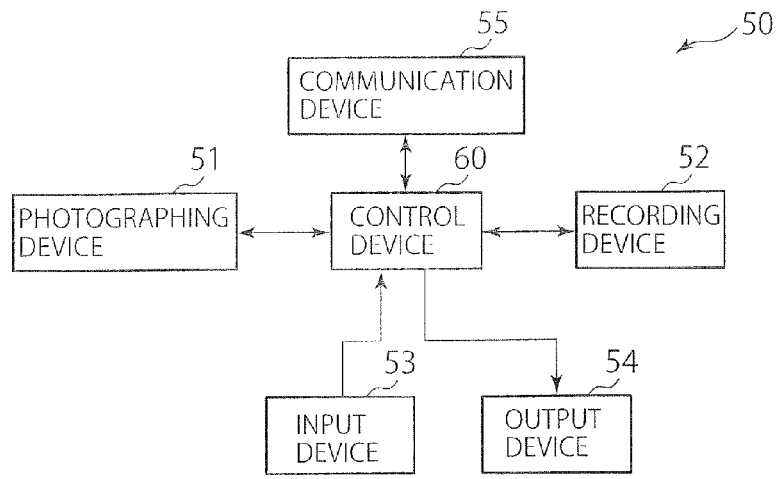
FIG. 4 is a view showing an example of a multifunctional portable terminal.

Next, the multifunctional portable terminal 50 is described. As shown in FIG. 4, the multifunctional portable terminal 50 includes a photographing device 51, a recording device 52, an input device 53, an output device 54, a communication device 55 and a control device 60. The photographing device 51 is a so-called digital camera used for taking an image. The communication device 55 is configured to communicate data to and from an external apparatus. For example, the communication device 55 functions to transmit an image taken by the photographing device 51 to the printing control system 10. The recording device 52 is configured to record an image taken by the photographing device 51 and information received by the communication device 15.

The input device 53 is configured to input information to the multifunctional portable terminal 50, and the output device 54 is configured to display information outputted from the multifunctional portable terminal 50. In general, the multifunctional portable terminal 50 such as a smart phone is provided with a display panel having a touch panel function, and the display panel can serve as the input device 53 and the output device 54.

The control device 60 is configured to properly transmit an image to be printed to the printing control system 10. For example, the control device 60 can generate a transmission command for transmitting an image, which has been selected by a participant from among images recorded in the recording device 52, to the printing control system 10. In this case, based on the transmission command, the communication device 55 transmits the image selected by a participant to the printing control system 10. A concrete structure of the control device 60 will be described later. In the following description, an image selected by a participant from among images recorded in the recording device 52 is also referred to as selected image. The term "selected image(s)" may mean either one image or a group of images simultaneously selected by a participant.

Control Device of Printing Control System

Figure 5:
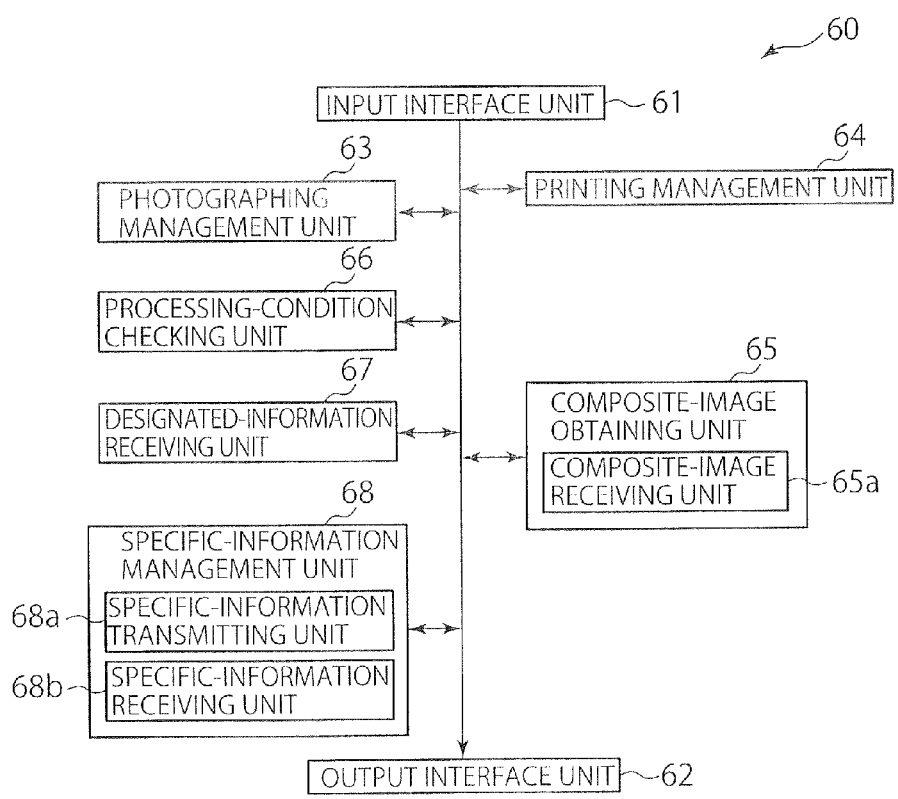
FIG. 5 is a view showing a control device of a multifunctional portable terminal, in the first embodiment of the present invention.

Next, a structural example of the control device 60 of the multifunctional portable terminal 50 is described. As shown in FIG. 5, the control device 60 includes an input interface unit 61, an output interface unit 62, and a printing management unit 64 connected to the interface units 61 and 62. The input interface unit 61 and the output interface unit 62 are configured to manage input of information from a peripheral device and output of information thereto.

(Printing Management Unit)

The printing management unit 64 is configured to generate a transmission command for transmitting, as a selected image, an image selected by a user from among images recorded in the recording device 52, to the printing control system 10. The printing control unit 64 may generate a transmission command such that all the selected images are transmitted to the printing control system 10, or may generate a transmission command such that only a selected image satisfying a predetermined condition is transmitted thereto, which will be described in a third embodiment.

(Photographing Management Unit)

In addition, as shown in FIG. 5, the control device 60 may further include a photographing management unit 63 configured to take an image with the use of the photographing device 51, based on an instruction inputted by a user through the input device 53.

(Processing-Condition Checking Unit)

As shown in FIG. 5, the control unit 60 may further include a processing-condition checking unit 66 configured to obtain processing-condition information relating to a processing condition of the printer 40. The processing-condition checking unit 66 may obtain processing-condition information directly from the printer 40. Alternatively, the processing-condition checking unit 66 may obtain processing-condition information, based on processing-condition information transmitted from the printing control system 10 to the multifunctional portable terminal 50. In this case, the processing-condition checking unit 66 may generate a transmission request to the processing-condition checking unit 26 of the printing control system 10, such that the printing control system 10 transmits processing-condition information to the multifunctional portable terminal 50.

(Composite-Image Obtaining Unit)

In addition, as shown in FIG. 5, the control unit 60 may further include a composite-image obtaining unit 65 configured to obtain a composite image formed by combining a selected image and predetermined format information with each other. For example, in this embodiment, the composite-image obtaining unit 65 includes a composite-image receiving unit 65a configured to receive a composite image which has been formed by the composite-image forming unit 25 of the printing control system 10 and has been transmitted toward the multifunctional portable terminal 50.

(Designated-Information Receiving Unit)

In addition, as shown in FIG. 5, the control unit 60 may further include a designated-information receiving unit 67 that is managed by the designated-information management unit 27 of the printing control system 10, and is configured to receive the aforementioned designated information transmitted to the multifunctional portable terminal 50. The designated information received by the designated-information receiving unit 67 may be displayed on the outputting device 54.

(Specific-Information Management Unit)

In addition, as shown in FIG. 5, the control unit 60 may further include a specific information management unit 68 having a specific-information transmitting unit 68a configured to transmit the aforementioned specific information toward the printing control system 10, and a specific-information receiving unit 68b that is managed by the specific-information management unit 28 of the printing control system 10, and is configured to receive specific information transmitted to the multifunctional portable terminal 50. The specific information received by the specific-information receiving unit 68b may be displayed on the outputting device 54.

Program for Control Device of Multifunctional Portable Terminal

The control device 60 of the multifunctional portable terminal 50 is constituted by installing, in a computer incorporated in the multifunctional portable terminal 50, a program for causing the computer to function as the above-described control device 60. When the multifunctional portable terminal 50 is a smart phone, such a program is also referred to as "application". The program may be previously installed in the computer upon shipment of the computer. Alternatively, the program may be installed on the computer after shipment of the computer, with the use of a recording medium storing the program, which is readable by the computer. The type of the recording medium is not particularly limited. The recording medium may be a portable recording medium such as a magnetic disc or an optical disc, a fixed-type recording medium such as a hard disc device or a memory, and so on. The program may be distributed through a communication line such as an internet. For example, it can be considered that a user of the multifunctional portable terminal 50 buys a program (application) in the Apple Store or the Android Market, and that the program is transmitted to the multifunctional portable terminal 50 through a communication line. When the program is distributed through a communication line, a recording medium storing the program according to this embodiment is present at least temporarily, in a server for distribution.

Printing Method

Next, an operation and an effect of this embodiment as structured above will be described.

Herein, there is described a method of printing an image recorded in the multifunctional portable terminal 50 by using the printing system 1.

(Method of Installing Program)

Firstly, there is described an example of a method of installing a program (hereinafter referred to also as "application") of installing, in the multifunctional portable terminal 50, a program for causing the computer of the multifunctional portable terminal 50 to function as the aforementioned control device 60.

In an event hall, there is generally disposed a guide plate 7 displaying event contents and a notice to event participants (hereinafter referred to simply as "participant(s)") (see FIG. 1). The guide plate 7 may show information announcing that the printer 40 for printing an image is located, and information announcing that an image can be printed by the printer 40 with the use of an application of the multifunctional portable terminal 50. In addition, the guide plate 7 may display the name of the application, URLs of websites of the Apple Store and the Android Market by which the application can be downloaded, or two-dimensional codes such as QR codes recording the URLs. Thus, the participants can easily install the application in their respective multifunctional portable terminals 50. When the application is installed in the multifunctional portable terminal 50, a participant may register personal information, such as his/her name, etc. in the application. Alternatively, when the application is installed in the multifunctional portable terminal 50, the above-described control device 60 implemented as the application may obtain personal information previously recorded in the multifunctional portable terminal 50.

Figure 6:
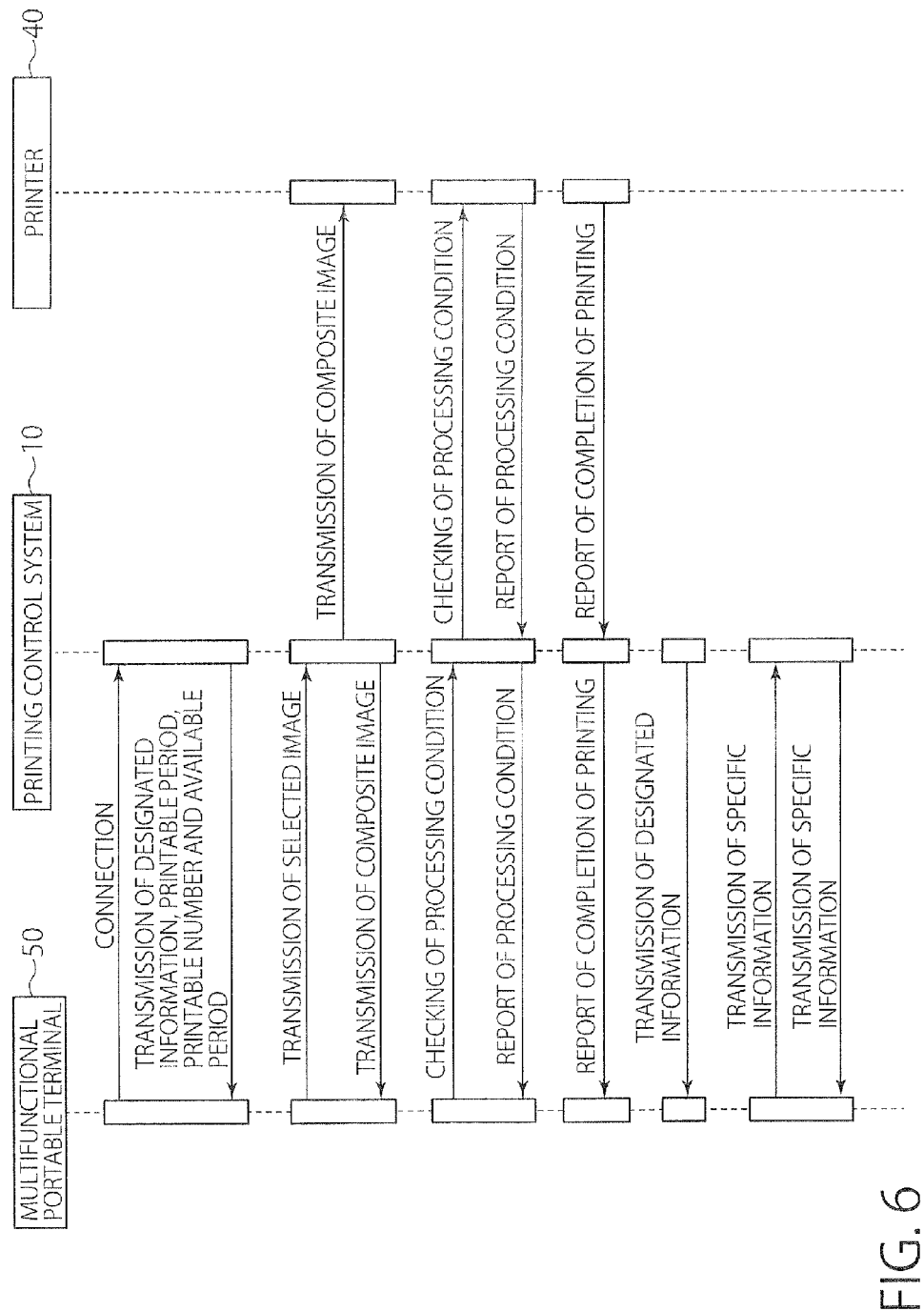
FIG. 6 is a sequence view showing a procedure of printing an image, in the first embodiment of the present invention.

Next, a procedure of printing an image is described along the sequence view shown in FIG. 6.

(Method of Activating Application)

At first, each participant activates the installed application. After the application has been activated, the control device 60 of the multifunctional portable terminal 50 tries connection to the printing control system 10. At this time, the output device 54 of the multifunctional portable terminal 50 may display, as an access point, the wireless router 6 to which the multifunctional portable terminal 50 can be connected. The participant selects an access point in a local area network to which the printing control system 10 corresponding to the event hall where the participant is present. At this time, as name title of the access point, a name relating to the event, such as an event organizer, an event hall and the like may be used. In addition, the name of the access point may be displayed on the guide plate 7. Thus, each participant can easily select the suitable access point.

Figure 7:
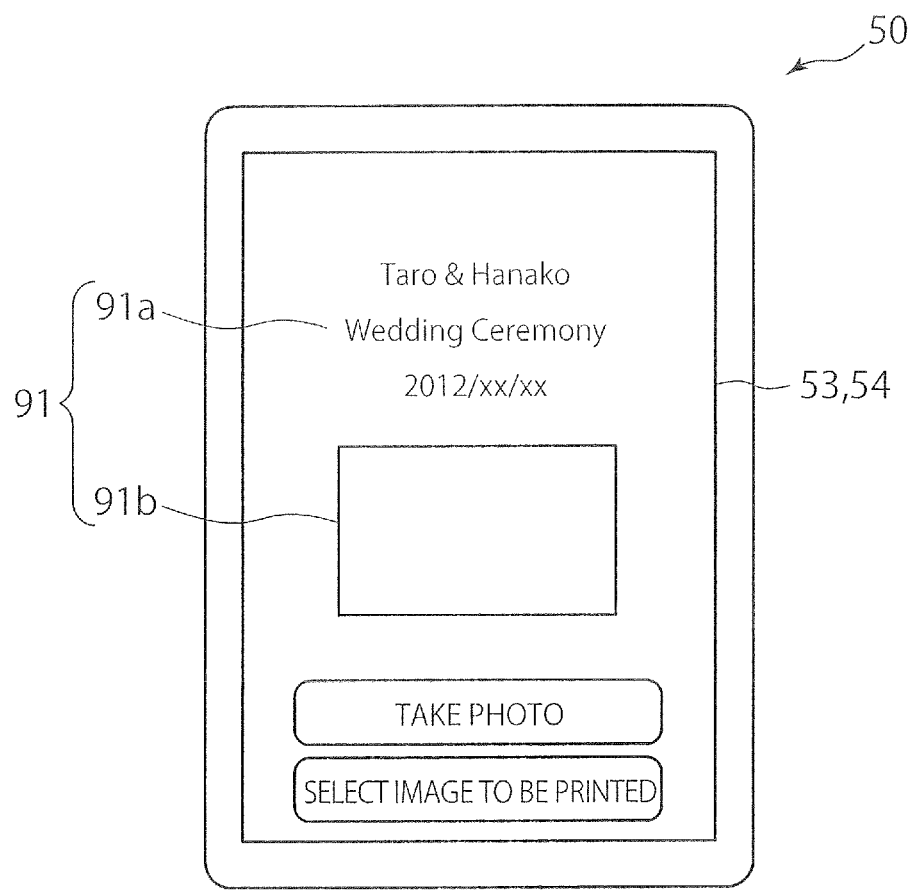
FIG. 7 is an example of a screen displayed on an output device of a multifunctional portable terminal upon activation.

When the multifunctional portable terminal 50 is connected to the printing control system 10 through the wireless router 6, as shown in FIG. 6, the control device 20 of the printing control system 10 transmits, to the multifunctional portable terminal 50, designated information, and information relating to a printable period, a printable number and an available period. As shown in FIG. 7, the control device 60 of the multifunctional portable terminal 50, which has received the designated information, may display the designated information 91 on the output device 54. In the example shown in FIG. 7, the designated information 91 includes designated character information 91a including character information relating to event contents and a date. The designated information 91 may further include designated image information 91b including an image relating to the event. Although not shown, the multifunctional portable terminal 50 may display the information relating to the printable period, the printable number and the available period, in addition to the designated information 91, on the output device 54. Thus, the participants can know there is the restriction on printing of an image and the restriction contents.

(Method of Transmitting Image)

Then, the participant selects, through the input device 53, an image desired to be printed from among images recorded in the recording device 52. The printing management unit 64 of the control device 60 of the multifunctional portable terminal 50 generates a transmission command for transmitting the image, which has been selected as a selected image, to the printing control system 10. Thus, the selected image is transmitted to the printing control system 10 through the communication device 55 and the wireless router 6. When the participant hopes that an image taken by the photographing device 51 is immediately printed, the photographing management unit 63 and the printing management unit 64 of the control device 60 may be set such that a photographed image is immediately transmitted to the printing control system 10.

An image to be selected by the participant is not limited to an image recorded in the recording device 52 of the multifunctional portable terminal 50. Various images that can be selected with the use of the multifunctional portable terminal 50 may be used as the selected image in this embodiment. For example, a participant may select an image, which is recorded in a recording device of a server that can be connected to the multifunctional portable terminal 50 through the Internet, by using the multifunctional portable terminal 50. In this case, data of the image selected by the multifunctional portable terminal 50 are downloaded in the multifunctional portable terminal 50 through the internet, and then the image data are transmitted to the printing control system 10.

(Printing Control Method)

Next, a printing control method, which is carried out by the printing control system 10, is described with reference to FIG. 8. In the printing control system 10, there have been previously performed a printable-period setting step in which a printable period is set in the printable-period setting unit 24a, a printable number setting step in which a printable number is set in the printable-number setting unit 24b, and an available-period setting step in which an available period during which the printer 40 can be used is set in the available-period setting unit 24c.

Firstly, the printing control system 10 receives a selected image having been transmitted from a certain multifunctional portable terminal 50 (hereinafter referred to also as "terminal A") among a plurality of multifunctional portable terminals 50, with the use of the communication device 15 (data receiving step S101). Then, the received-information management unit 23 of the control device 20 of the printing control system 10 records the selected image having been received in the data receiving step, in, e.g., the received-image recording unit 35a of the recording device 35, as a received image (recording step). Thereafter, the printing management unit 24 of the control device 20 performs printing command steps (S102 to S104) in which a printing command for printing the received image by the printer 40 is judged to be generated or not. The recording step may be performed succeeding to the printing command steps (S102 to S104), such that only an image that has been identified as an item to be printed in the printing command steps (S102 to S104) is recorded in the received-image recording unit 35a.

In the printing command steps, there is firstly performed the step S102 in which a current time is judged to be within the available period set in the available-period setting unit 24c or not. Herein, when the current time is out of the available period, i.e., when the available period is set as "from 10 o'clock to 12 o'clock" but the current time is 13 o'clock, for example, the received image is excluded from an item(s) to be printed (S108).

On the other hand, when the current time is within the available period, in the printing command steps, there is performed the step S103 in which a creation date and time of the received image is judged to be within the printable period set in the printable-period setting unit 24a or not. Herein, when the creation date and time of the received image is out of the printable period, i.e., when the printable period is set as "current day" but the creation date and time of the received image is the day one week ago the event, for example, the received image is excluded from an item to be printed (S109). When the received images are a group of images that have been simultaneously received by the printing control system 10 from a certain multifunctional portable terminal 50, and a creation date and time of only one or more image(s) from among the plurality of images is out of the printable period, only the image(s) may be excluded from an item to be printed.

On the other hand, when the creation date and time of the received image is within the printable period, in the printing command steps, there is performed the step S104 in which the number of received images is judged to be within the printable number set in the printable-number setting unit 24b or not. Herein, when the number of received images is out of the printable number, i.e., when the printable number is set as "three" but the number of received images is five, for example, at least a part of the received images, which exceeds the printable number, is excluded from an item to be printed (S110). For example, two images out of the five received images, which have been lately received by the printing control system 10, are excluded from an item to be printed. At this time, all the five received images may be excluded from an item to be printed.

Thereafter, the printing management unit 24 generates a printing command for the received image that has not been excluded from an item to be printed in the above respective steps (S107). Thus, the received image is transmitted as an item to be printed to the printer 40. Meanwhile, when there is a received image that has been excluded from an item to be printed in the above respective steps, the terminal A may be informed of this fact (S111).

(Method of Forming Composite Image)

Figure 8:
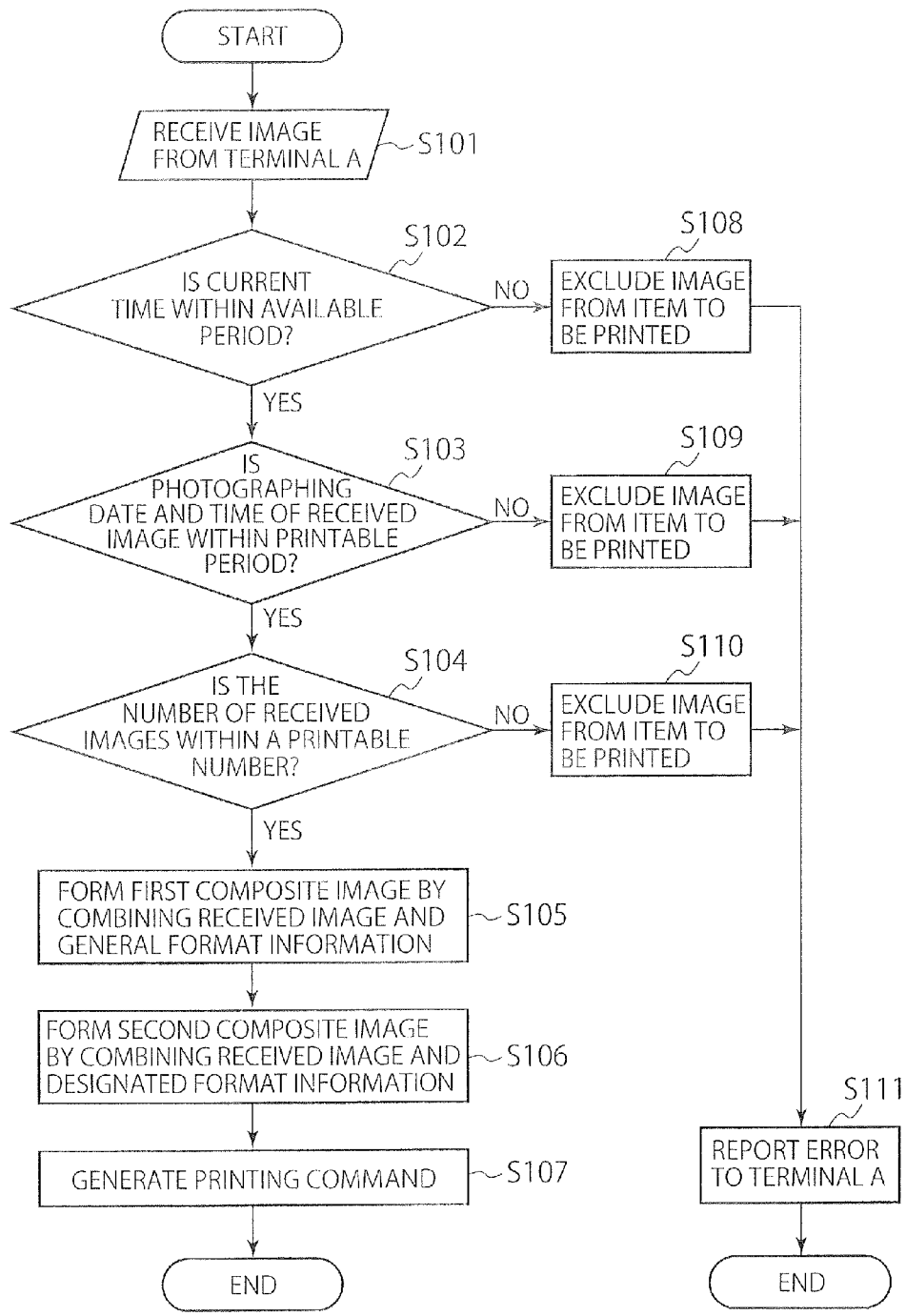
FIG. 8 is a flowchart showing a procedure along which the control device of the printing control system generates a printing command, in the first embodiment of the present invention.
Figure 9:
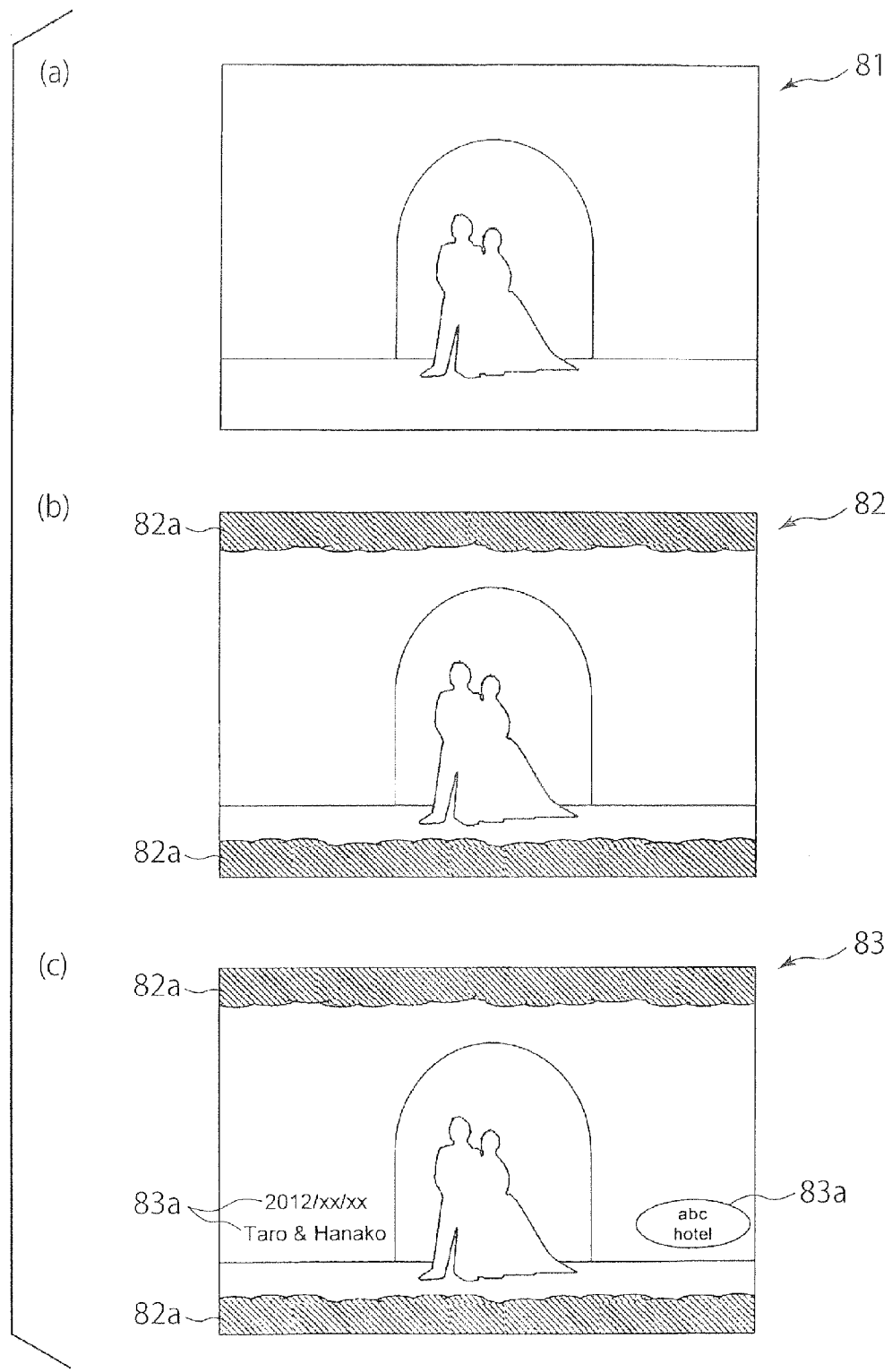
FIG. 9(a) is a view showing an example of an image.
FIG. 9(b) is a view showing an example of a first composite image obtained by combining the image and general format information.
FIG. 9(c) is a view showing an example of a second composite image obtained by combining the first composite image and designated format information.

As shown by a step S105 in FIG. 8, before the printing command is generated and the received image is transmitted to the printer 40, the composite-image forming unit 25 of the control device 20 may form a first composite image by combining the received image and general format information with each other. In FIG. 9(a), an example of the received image is indicated by the reference number 81. In FIG. 9(b), an example of the first composite image, which has been formed by combining the received image and the general format information 82a with each other, is indicated by the reference number 82. FIG. 9(b) shows an example in which the general format information 82a is a frame extending along an upper edge and a lower edge of the picture.

As shown by a step S106 in FIG. 8, before the printing command is generated and the received image is transmitted to the printer 40, the composite-image forming unit 25 of the control device 20 may form a second composite image by combining the received image or the first composite image and designated format information with each other. In FIG. 9(c), an example of the second composite image, which has been formed by combining the received image or the first composite image and the designated format information 83a with each other, is indicated by the reference number 83. FIG. 9(c) shows an example in which the designated format information 83a includes information relating to an event date and time and event organizers, and a logotype of the event hall.

The above steps S105 and S106 for forming a composite image may be performed prior to the printing command steps S102 to S104.

As shown in FIG. 6, the first composite image 82 or the second composite image 83, which have been formed as described above, may be transmitted as an item to be printed to the printer 40. Alternatively, the first composite image 82 or the second composite image 83 may be transmitted to the multifunctional portable terminal 50 that has transmitted the received image based on which the composite image is formed, i.e., the terminal A. The composite image transmitted to the terminal A is received by the composite-image receiving unit 65a of the composite-image obtaining unit 65. The composite image received by the composite-image receiving unit 65a may be displayed on the output device 54 of the terminal A or recorded in the recording device 52 of the terminal A.

(Method of Obtaining Processing-Condition Information)

Figure 10:
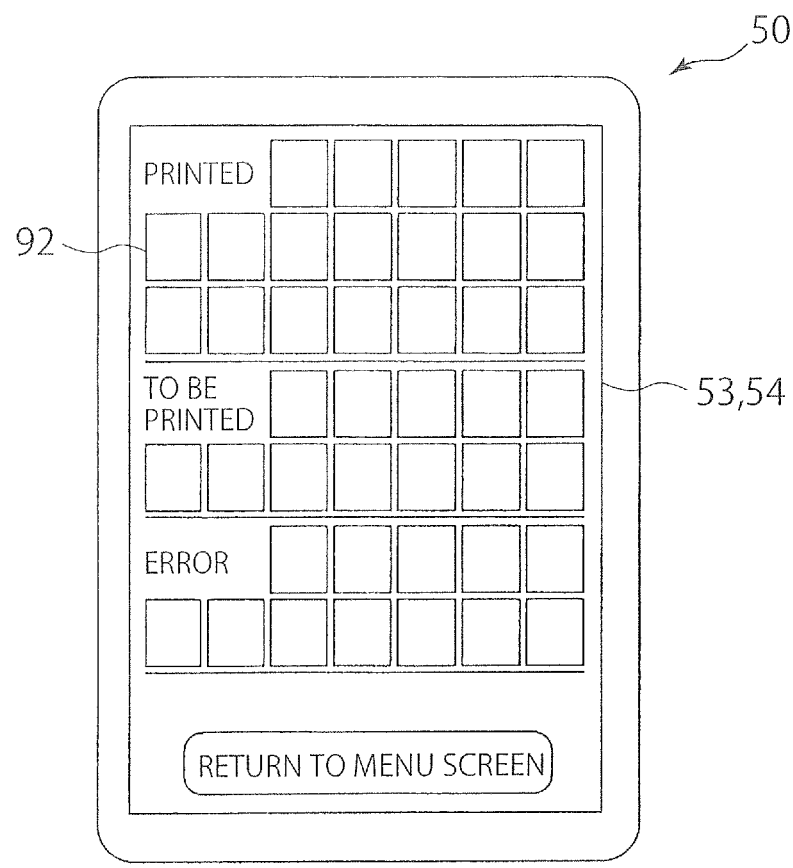
FIG. 10 is a view showing a multifunctional portable terminal displaying processing-condition information relating to a processing condition of a printer.

Thereafter, as shown in FIG. 6, during a time before an image such as the received image or the composite image, which has been transmitted toward the printer 40, is printed, processing-condition information relating to a processing condition of the printer 40 may be obtained. For example, the processing-condition checking unit 66 of the control device 60 of the terminal A transmits a transmission request relating to the processing-condition information toward the printing control system 10. The printing control system 10 having received the transmission command from the terminal A obtains the processing-condition information of the printer 40, by using the processing-condition checking unit 26. The thus obtained processing-condition information is transmitted toward the terminal A. FIG. 10 is a view showing an example of the processing-condition information displayed on the output device 54 of the terminal A. As shown in FIG. 10, the processing-condition information 92 may include information relating to an image that has been already printed, information relating to an image waiting for printing, and information relating to an image that has not been printed by error. Printed images may be arranged in the order in which the images have been printed. Images waiting for printing may be arranged in the order in which the images are to be printed. An error image may be an image that has not been printed because of a reason of the printer 40, e.g., an inappropriate resolution or size of the image. In addition, an image that has been excluded from an item to be printed in the above printing command steps may be included in the error image.

(Report of Completion of Printing)

After that, when the image having been transmitted from the terminal A has a turn of being printed, the printer 40 prints the image. Thus, a picture of the image having been transmitted from the terminal A is manufactured. As shown in FIG. 6, information announcing that the image having been transmitted from the terminal A has been just printed may be transmitted from the printer 40 to the terminal A through the printing control system 10.

Herebelow, advantages provided in this embodiment are described.

According to this embodiment, the printing management unit 24 of the control device 20 of the printing control system 10 includes the printable-period setting unit 24a configured to set a printable period. When a creation date and time of an image received from a multifunctional portable terminal 50 is out of the printable period set in the printable-period setting unit 24a, the printing management unit 24 excludes the image from an item to be printed. Thus, it can be prevented that, from among images recorded in a multifunctional portable terminal 50, an image irrelevant to the event or an image not closely related to the event is printed. Thus, a load on the printer 40 can be alleviated, whereby a waiting time for each participant to receive a picture can be reduced.

In addition, according to this embodiment, the printing management unit 24 of the control device 20 of the printing control system 10 includes the printable-number setting unit 24b configured to set a printable number. When the number of images received from a multifunctional portable terminal 50 is out of the printable number set in the printable-number setting unit 24b in the series of processes, the printing management unit 24 excludes at least a part of the images, which exceeds the printable number, from an item to be printed. Thus, it can be prevented that a large number of images transmitted from a certain multifunctional portable terminal 50 are printed. Thus, a load on the printer 40 can be alleviated, whereby a waiting time for each participant to receive a picture can be reduced. In addition, no participant can be treated unfairly in terms of the number of printed images.

In addition, according to this embodiment, the printing management unit 24 of the control device 20 of the printing control system 10 includes the available-period setting unit 24c configured to set an available period during which the printer 40 can be used. When a current time is out of the available period set in the available-period setting unit 24c, the printing management unit 24 excludes the image from an item to be printed. Thus, it can be prevented that the printer 40 is activated during an unexpected time.

In addition, according to this embodiment, the control device 60 of a multifunctional portable terminal 50 includes the processing-condition checking unit 66 configured to obtain processing-condition information relating to a processing condition of the printer 40. Thus, each participant can check a congestion condition of the printer 40. Therefore, when the printer 40 is congested, it is possible to remind each participant to restrain himself/herself from printing, e.g., to reduce the number of images to be printed or to give up printing of an image. Thus, a load on the printer 40 can be alleviated, whereby a waiting time for each participant to receive a picture can be reduced. In addition, each participant can estimate a time required for an image having been transmitted by each participant to be printed.

In addition, according to this embodiment, the control device 20 of the printing control system 10 includes the composite-image forming unit 25 configured to form a composite image by combining an image transmitted from a multifunctional portable terminal 50 and format information with each other. Thus, for example, by combining an image and general format information so as to form a first composite image 82, a picture excellent in design can be provided to each participant in the event hall. Further, by combining an image and designated format information so as to form a second composite image 83, a remindful picture including information peculiar to the event can be provided to each participant in the event hall.

(Transmission and Reception of Designated Information)

While the event is being held, as shown in FIG. 6, the printing control system 10 may transmit designated information that has been previously prepared toward each multifunctional portable terminal 50, at a time set in the time setting unit 27a of the designated-information management unit 27. Thus, the designated information can be easily and rapidly transmitted to each participant. The designated information transmitted as above may include a thank-you message, a video or an image from the event organizer to each event participant. The designated information may be recorded in the recording apparatus 52 of the multifunctional portable terminal 50.

(Transmission and Reception of Specific Information)

While the event is being held, as shown in FIG. 6, a certain multifunctional portable terminal 50 (terminal A) may transmit designated information toward the printing control system 10, with the use of the specific-information transmitting unit 68a of the specific-information management unit 68. The printing control system 10 having received the specific information may transmit the specific information toward the multifunctional portable terminals 50, with the use of the specific-information management unit 28. Thus, transmission and sharing of information can be promptly achieved among the event participants. The printing control system 10 may transmit the designated information to the multifunctional portable terminals 50 excluding the terminal A or transmit the designated information to the multifunctional portable terminals 50 including t terminal A.

(Modification Example of Printing Command Step)

In the aforementioned printing command steps, there is described the example in which the restriction on an item to be printed based on the printable period, the restriction on an item to be printed based on the printable number, and the restriction on an item to be printed based on the available period are performed. However, not limited thereto, at least one of the restrictions based on the printable period, the printable number or the available period may be performed. For example, only one type of restriction among the three types of restrictions may be performed, or any two types of restrictions among the three types of restrictions may be performed.

Second Embodiment

Figure 11:
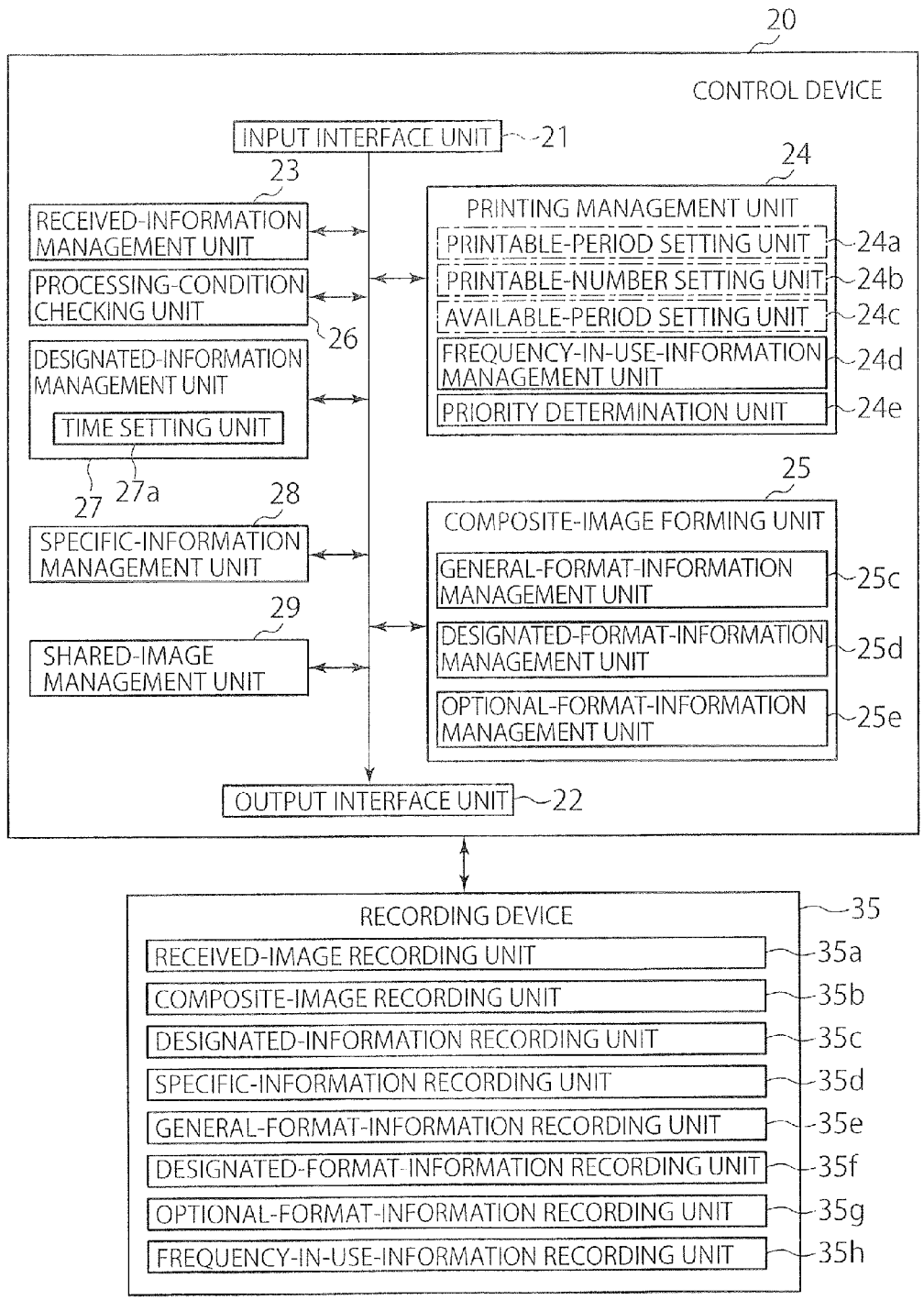
FIG. 11 is a view showing a control device of a printing control system, in a second embodiment of the present invention.

Next, a second embodiment of the present invention will be described with reference to FIGS. 11 and 12. In the second embodiment shown in FIGS. 11 and 12, ordering of priority in printing of images, which have been transmitted from respective multifunctional portable terminals 50, is determined depending on a frequency at which the respective multifunctional portable terminals 50 use the printer 40. In the second embodiment shown in FIGS. 11 and 12, the same parts as those of the first embodiment shown in FIGS. 1 to 10 are shown by the same reference numbers, and detailed description thereof is omitted.

Control Device of Printing Control System

There is firstly described an example of a structure of a control device 20 of a printing control system 10 in this embodiment. As shown in FIG. 11, a printing management unit 24 of the control device 20 includes a frequency-in-use information management unit 24d configured to manage frequency-in-use information relating to a frequency at which each multifunctional portable terminal 50 uses the printer 40, and a priority determination unit 24e configured to determine ordering of priority in printing of images transmitted from the respective multifunctional portable terminals 50, depending on the frequency-in-use information. As shown by the one-dot chain lines in FIG. 11, the printing management unit 24 may further include any of a printable-period setting unit 24a, a printable-number setting unit 24b and an available-period setting unit 24c, or a combination thereof.

The concrete contents of the frequency-in-use information are not particularly limited, as long as the frequency-in-use information serves as an indicator for securing equity among participants. For example, the frequency-in-use information may be a total sum of images printed by the printer based on a command of each multifunctional portable terminal 50, during a period from the event starting time to the current time or during a certain period in the event. Alternatively, the frequency-in-use information may be a total sum of periods in which the printer 40 is occupied by each multifunctional portable terminal 50 such that an image is printed by the printer 40, during a period from the event starting time to the current time or during a certain period in the event. As shown in FIG. 11, the frequency-in-use information may be recorded in a frequency-in-use-information recording unit 35h of a recording device 35.

Printing Control Method

Next, there is described an example of a method by which the priority determination unit 24 determines ordering of priority in printing of images transmitted from the respective multifunctional portable terminals 50, depending on frequency-in-use information. In the example shown herein, an allowable value (herebelow also referred to as "allowable frequency") of a frequency at which each multifunctional portable terminal 50 uses the printer 40 is previously set. For example, an allowable frequency, which is counted from the beginning of the event, for a total sum of the number of images printed by the printer 40 based on a command of each multifunctional portable terminal 50 is set as ten.

Figure 12:
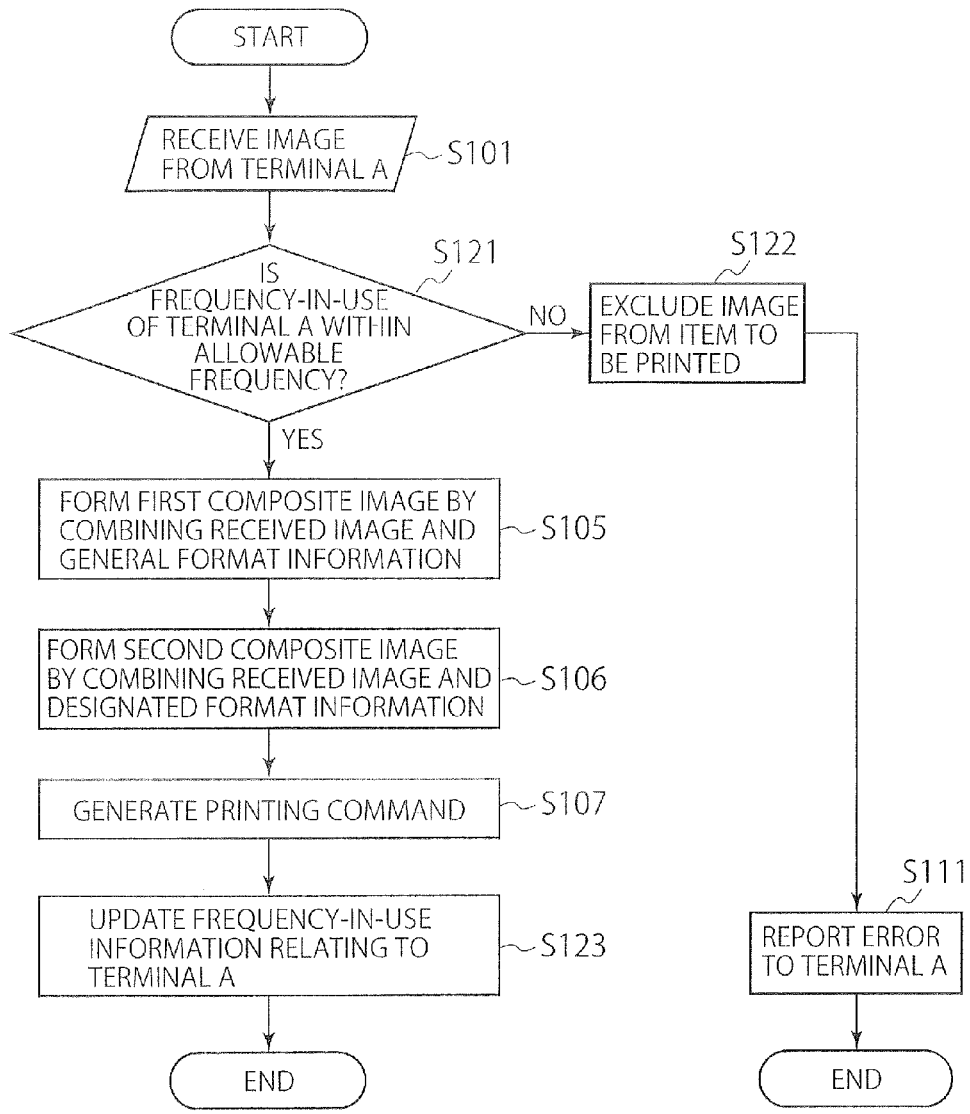
FIG. 12 is a flowchart showing an example of determining ordering of priority in printing, in the second embodiment of the present invention.

As shown in FIG. 12, the printing control system 10 receives a selected image transmitted from a terminal A, and records the selected image as a received image in the recording device 35. Thereafter, the printing management unit 24 of the control device 20 of the printing control system 10 performs a printing command step (S121) in which a printing command for printing the received image by using the printer 40 is judged to be generated or not.

In the printing command step, the priority determination unit 24e of the printing management unit 24 firstly judges whether frequency-in-use information relating to the terminal A is within the allowable frequency or not. When the frequency-in-use information relating to the terminal A is out of the allowable frequency, for example, a total sum of images printed by the printer 40 based on a command of the terminal A from the beginning of the event to the current time is eleven but the allowable frequency is ten, the priority determination unit 24 determines that the received image is excluded from an item to be printed (S122). Namely, the priority determination unit 24e determines to lower the ordering of priority in printing of the received image from the terminal A, as compared with ordering of priority in printing of a received image from another terminal. In this case, the fact that the image has been excluded from an item to be printed may be informed of the terminal A (S111).

On the other hand, when the frequency-in-use information relating to the terminal A is within the allowable frequency, the priority determination unit 24e determines that the received image is to be printed. Then, the printing management unit 24 generates a printing command (S107). Thus, the received image is transmitted as an item to be printed to the printer 40. Thereafter, the frequency-in-use information management unit 24d updates the frequency-in-use information relating to the terminal A. For example, the number of images which have been determined as an item to be printed is added to the number of image(s) recorded in the frequency-in-use-information recording unit 35h.

Although there has been described the example in which, when the frequency-in-use information relating to the terminal A is out of the allowable frequency, the priority determination unit 24e excludes the received image from the terminal A from an item to be printed, the present invention is not limited thereto. For example, when the frequency-in-use information relating to the terminal A is out of the allowable frequency, the priority determination unit 24e may temporarily suspend its determination that the received image from the terminal A is to be printed, and may perform, prior to the above determination, a priority determination relating to an image transmitted from another multifunctional portable terminal 50.

In addition, although there has been described the example in which the priority determination unit 24e determines ordering of priority in printing of received images from the multifunctional portable terminals 50 based on the fact that the frequency-in-use information of the respective multifunctional portable terminals 50 is within the allowable frequency or not, the present invention is not limited thereto. For example, the priority determination unit 24e may compare frequency-in-use information of the plurality of multifunctional portable terminals 50, and may determine ordering of priority in printing of received images from the respective multifunctional portable terminals 50.

For example, the priority determination unit 24e may relate frequency-in-use information relating to each multifunctional portable terminal 50 to a received image from each multifunctional portable terminal 50. For example, the accumulation number of eleven, which is a total sum of images printed by the printer 40 based on a command of the terminal A from the beginning of the event to the current time, is related to a received image from the terminal A. In this case, ordering of printing of received images may be determined in an ascending order of the accumulated numbers. For example, when a total sum of images printed by the printer 40 based on a command of another multifunctional portable terminal 50, e.g., a terminal B is eight, the priority determination unit 24e relates the accumulation number of "eight" to a received image from the terminal B. In this case, since the accumulation number related to the received image from the terminal B is smaller than the accumulation number related to the received image from the terminal A, the received image from the terminal B is printed in advance of the received image from the terminal A. Namely, by using the priority determination unit 24e, it can be determined whether priority is given to printing of the received image from the terminal A or printing of the received image from the terminal B.

The process in which the ordering of received images is determined depending on the accumulation numbers related to received images from the respective multifunctional portable terminals 50 may be performed in the printing control system 10 or in the printer 40.

When this process is performed in the printing control system 10, the printing control system 10 stores a received image from each multifunctional portable terminal 50, and the accumulated number related to each received image, in the printing control system 10, for example. For each time when a printing process in the printer 40 is completed, the printing control system 10 transmits a received image whose accumulation number is smallest from among the received images of the respective multifunctional portable terminals 50, which are stored in the printing control system 10. Thus, the received images from the respective multifunctional portable terminals 50 can be printed in an ascending order of the accumulation numbers.

On the other hand, when the process is performed in the printer 40, the printing control system 10 transmits received images from the respective multifunctional portable terminals 50 together with the accumulation numbers. The printer 40 is provided with, for example, a control means for printing the received images in an ascending order of the accumulation numbers. Thus, the received images from the respective multifunctional portable terminals 50 can be printed in an ascending order of the accumulation numbers.

According to this embodiment, the printing management unit 24 of the control device 20 of the printing control system 10 includes the frequency-in-use information management unit 24d configured to manage frequency-in-use information of the respective multifunctional portable terminals 50, and the priority determination unit 24e configured to determine ordering of priority in printing of images transmitted from the respective multifunctional portable terminals 50 depending on the frequency-in-use information. Thus, ordering of priority in printing of the images transmitted from the respective multifunctional portable terminals 50 can be determined, depending on a frequency at which each multifunctional portable terminal 50 uses the printer 40. Therefore, no participant can be treated unfairly in terms of the number of printed images and the ordering of printing of the images.

Also in this embodiment, similarly to the above-described first embodiment, there may be performed the step S105 in which a first composite image is formed by combining a received image and general format information with each other, and the step S106 in which a second composite image is formed by combining the received image or the first composite image and designated format information with each other. In addition, in the printing command step, there may be further performed any of the restriction on an item to be printed based on the printable period, the restriction on an item to be printed based on the printable number, and the restriction on an item to be printed based on the available period, or a combination thereof, which have been described in the aforementioned first embodiment.

Third Embodiment

Figure 13:
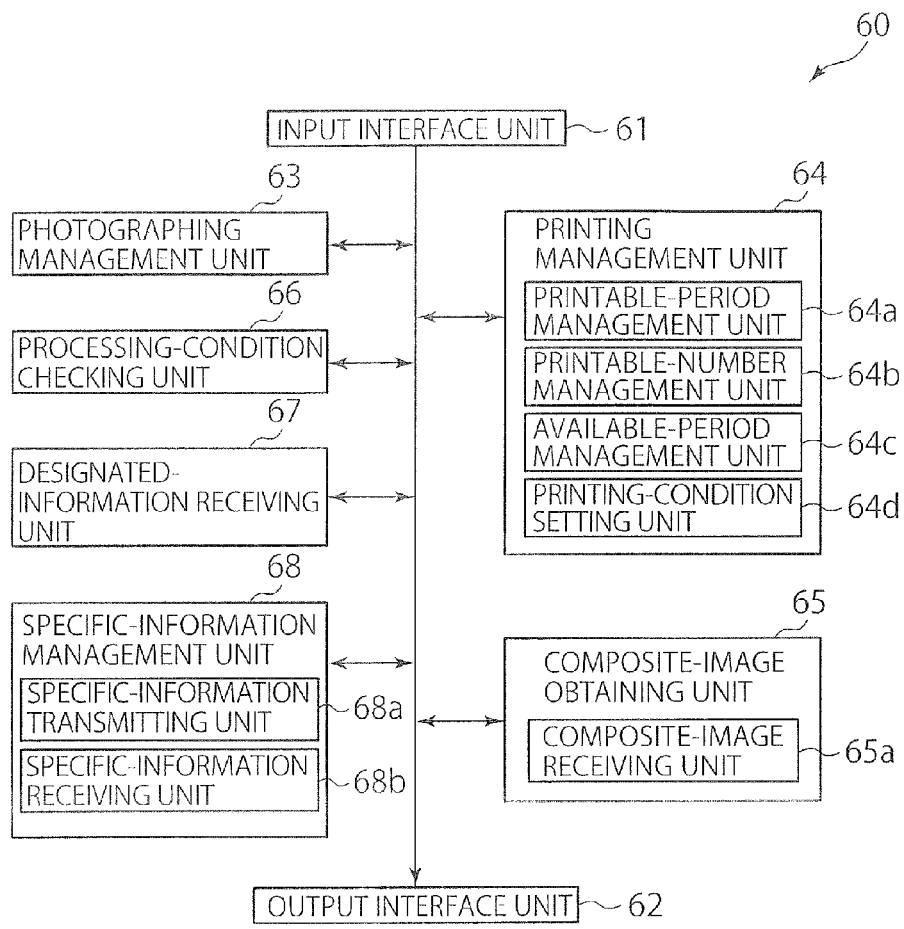
FIG. 13 is a view showing a control device of a multifunctional portable terminal, in a third embodiment of the present invention.
Figure 14:
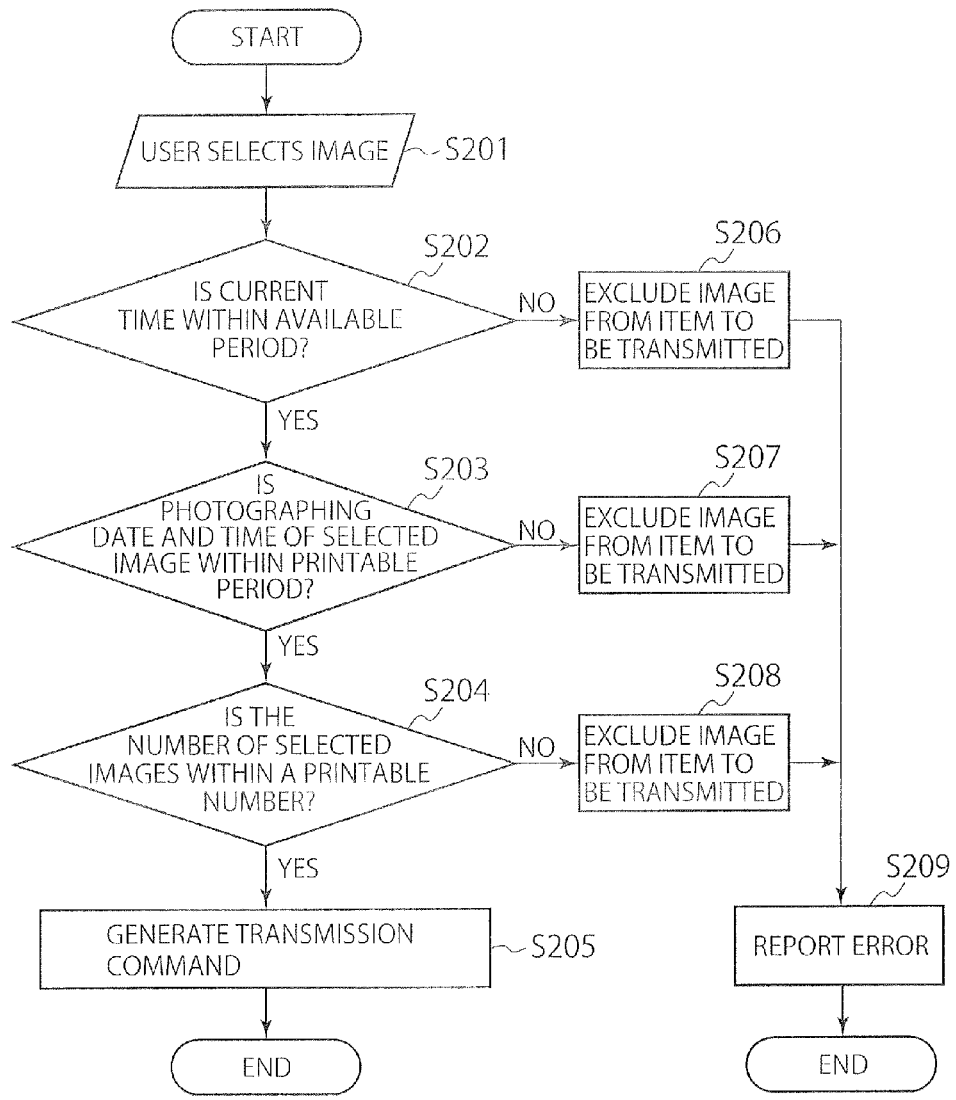
FIG. 14 is a flowchart showing a procedure along which the control device of a multifunctional portable terminal generates a transmission command.

Next, there is described a third embodiment of the present invention with reference to FIGS. 13 and 14. In the third embodiment shown in FIGS. 13 and 14, there is described an example in which the restriction process based on a printable period, the restriction process based on a printable number, and the restriction process based on an available period, which are performed in the printing control system 10 in the above embodiments, are performed in a multifunctional portable terminal 50. In the third embodiment shown in FIGS. 13 and 14, the same parts as those of the first embodiment shown in FIGS. 1 to 10 are shown by the same reference numbers, and detailed description thereof is omitted.

Control Device of Multifunctional Portable Terminal

At first, there is described an example of a structure of a control device 60 of a multifunctional portable terminal 50 in this embodiment. In this embodiment, a printing management unit 64 of the control device 60 is configured to restrict an image(s) to be transmitted from the multifunctional portable terminal 50 to a printing control system 10, depending on a predetermined printable period, a printable number (the number of printable images) and an available period. Herein, since the meanings of the "printable period", the "printable number" and the "available period" are the same as those in the above first embodiment, detailed description thereof is omitted.

As shown in FIG. 13, the printing management unit 64 includes a printable-period management unit 64a configured to manage the printable period, a printable-number management unit 64b configured to manage a printable number, and an available-period management unit 64c configured to manage the available period of the printing system 1. The printing period, the printable number and the available period of the management units 64a, 64b and 64c may be set by a printing-condition setting unit 64d as shown in FIG. 13, based on information transmitted from the printing control system 10.

Alternatively, the printing period, the printable number and the available period may be previously set in the management units 64a, 64b and 64c, respectively.

Printing Method

Next, a printing method in this embodiment is described.

(Method of Activating Application)

At first, the participants activate the installed application. As described in the above first embodiment, upon activation of the application, the control device 60 of the multifunctional portable terminal 50 tries connection to the printing control system 10. After the multifunctional portable terminal 50 has been connected to the printing control system 10 through the wireless router 6, the control device 20 of the printing control system 10 transmits designated information and information relating to a printable period, a printable number and an available period, to the multifunctional portable terminal 50. Then, based on the information relating to the printable period, the printable number and the available period, which has been transmitted from the printing control system 10, the printing-condition setting unit 64d of the printing management unit 64 of the control device 60 sets the printable period of the printable-period management unit 64a, the printable number of the printable-number management unit 64b, and the available period of the available-period management unit 64c, respectively.

In general, an optimum printable period, an optimum printable number and an optimum available period may vary depending on the number of participants, an estimated cost of the events or a performance of the printer 40 installed therein. Thus, by previously setting a printable period, a printable number and an available period in the printing control system correspondingly to the event, and by reflecting these settings on the respective multifunctional portable terminals 50, a suitable printing restriction process suited for the event can be achieved. However, there is a possibility that a multifunctional portable terminal 50 fails in connecting to the printing control system 10, upon activation of the application. In this case, it is possible to use, in the succeeding step, the parameters that are previously set in the respective management units 64a, 64b and 64c, as a printable period, a printable number and an available period. This situation may arise when a participant activates the application outside the event hall and then the participant arrives at the event hall. When a multifunctional portable terminal 50, which has failed in connecting to the printing control system 10, succeeds connecting to the printing control system 10, the multifunctional portable terminal 50 may obtain the information relating to the printable period, the printable number and the available period, from the printing control system 10, after the success in connection.

(Method of Transmitting Image)

Next, there is described a method performed by the control device 60 of the multifunctional portable terminal 50, in which an image selected by a user (participant) is transmitted toward the printing control system 10, with reference to FIG. 14.

At first, an image desired to be printed is selected, from among images recorded in the recording apparatus 52, by a participant through the input device 53 (step S201). Then, the printing management unit 64 of the control device 60 performs transmission command steps (S202 to S204) in which whether a transmission command for transmitting the image thus selected (selected image) is transmitted to the printing control system 10 is generated or not.

In the transmission command steps, there is firstly performed the step S202 in which a current time is judged to be within the available period of the available-period management unit 64c or not. When the current time is out of the available period, i.e., when the available period is set as "from 10 o'clock to 12 o'clock" but the current time is 13 o'clock, for example, the selected image is excluded from an item to be transmitted (S206).

On the other hand, when the current time is within the available period, there is performed, in the transmission command steps, the step S203 in which a creation date and time of the selected image is judged to be within the printable period of the printable-period management unit 64a or not. Herein, when the creation date and time of the selected imaged is out of the printable period, i.e., when the printable period is set as "current day" but the creation date and time of the selected image is the day one week ago the event, for example, the selected image is excluded from an item to be transmitted (S207). When the selected images are a group of images that have been simultaneously selected by a participant, and a creation date and time of only one ore or image(s) among the plurality of images is out of the printable period, only the image(s) may be excluded from an item to be transmitted.

On the other hand, when the creation date and time of the selected image is within the printable period, there is performed, in the printing command steps, the step S204 in which the number of selected images is judged to be within the printable number set in the printable-number management unit 64b or not. Herein, when the number of selected images is out of the printable number, i.e., when the printable number is set as "three" but the number of selected images is five, for example, at least a part of the selected images, which exceeds the printable number, is excluded from an item to be transmitted (S208). For example, two images out of the five selected images, which have been lately selected, are excluded from an item to be transmitted. At this time, all the five selected images may be excluded from an item to be transmitted.

Thereafter, the printing management unit 64 generates a printing command for the selected image that has not been excluded from an item to be transmitted in the above respective steps (S205). Thus, the selected image is transmitted to the printing control system 10. Meanwhile, when there is a selected image excluded from an item to be transmitted in the above respective steps, such information may be displayed on the output device 54 (S209).

According to this embodiment, the printing management unit 64 of the control device 60 of the multifunctional portable terminal 50 includes the printable-period management unit 64a configured to manage a printable period. When a creation date and time of an image selected by a participant is out of the printable period of the printable-period management unit 64a, the printing management unit 64 excludes the image from an item to be transmitted. Thus, it can be prevented that, from among images recorded in the multifunctional portable terminal 50, an image irrelevant to the event or an image not closely related to the event is transmitted to the printing control system 10. Thus, a load on the printer 40 can be alleviated, whereby a waiting time for each participant to receive a picture can be reduced.

In addition, according to this embodiment, the printing management unit 64 of the control device 60 of the multifunctional portable terminal 50 includes the printable-number management unit 64b configured to manage a printable number. When the number of images selected by a participant in the series of processes is out of the printable number of the printable-number management unit 64b, the printing management unit 64 excludes at least a part of the images, which exceeds the printable umber, from an item to be transmitted. Thus, a load on the printer 40 can be alleviated, whereby a waiting time for each participant to receive a picture can be reduced. In addition, no participant can be treated unfairly in terms of the number of printed images.

In addition, according to this embodiment, the printing management unit 64 of the control device 60 of the multifunctional portable terminal 50 includes the available-period management unit 64c configured to manage an available period during which the printer 40 can be used. When a current time is out of the available period of the available-period management unit 64c, the printing management unit 64 excludes the image from an item to be transmitted. Thus, it can be prevented that an image is transmitted to the printing control system 10 so that the printer 40 is activated at an unexpected time.

In the aforementioned printing command steps, there is described the example in which the restriction on an item to be printed based on the printable period, the restriction on an item to be printed based on the printable number, and the restriction on an item to be printed based on the available period are performed. However, not limited thereto, at least one of the restrictions based on the printable period, the printable number or the available period may be performed. For example, only one type of restriction among the three types of restrictions may be performed, or any two types of restrictions among the three types of restrictions may be performed.

In addition, while the restriction process based on a printable period, the restriction process based on a printable number or the restriction process based on an available period is performed in the multifunctional portable terminal 50, which is as described above, the same restriction process may be further performed in the printing control system 10, similarly to the above first embodiment. Thus, a load on the printer 40 can be more reliably alleviated.

Fourth Embodiment

Figure 15:
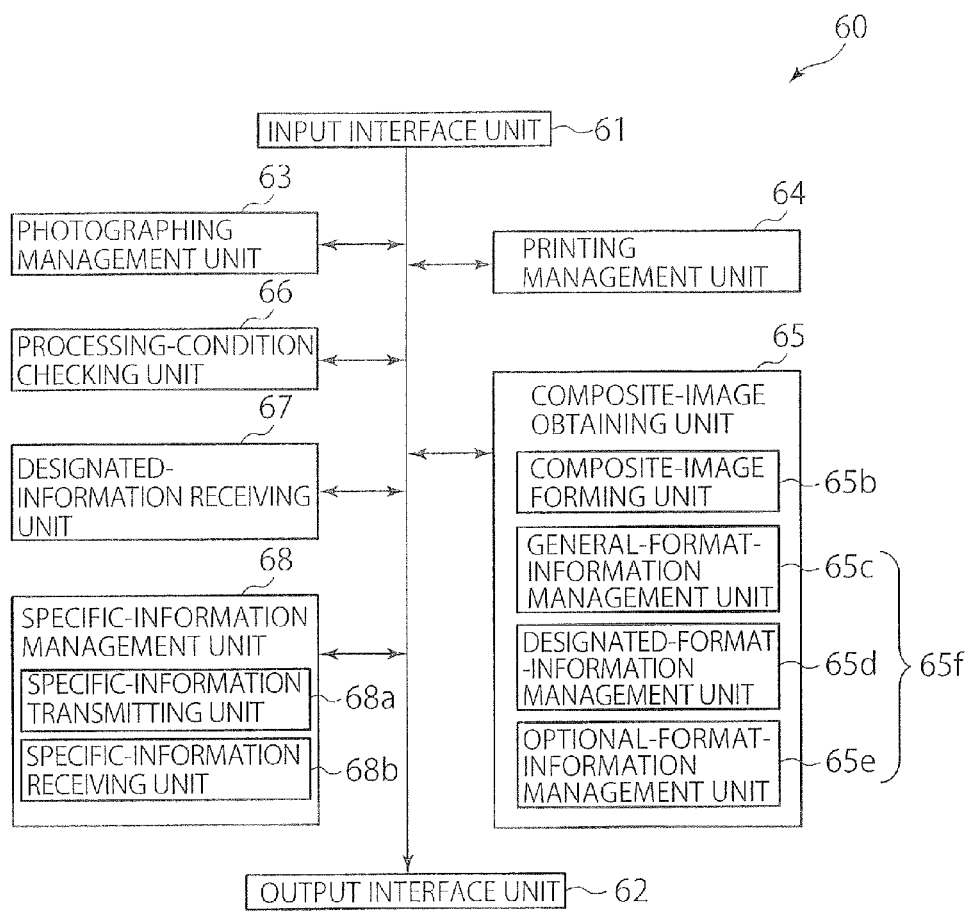
FIG. 15 is a view showing a control device of a multifunctional portable terminal, in a fourth embodiment of the present invention.
Figure 16:
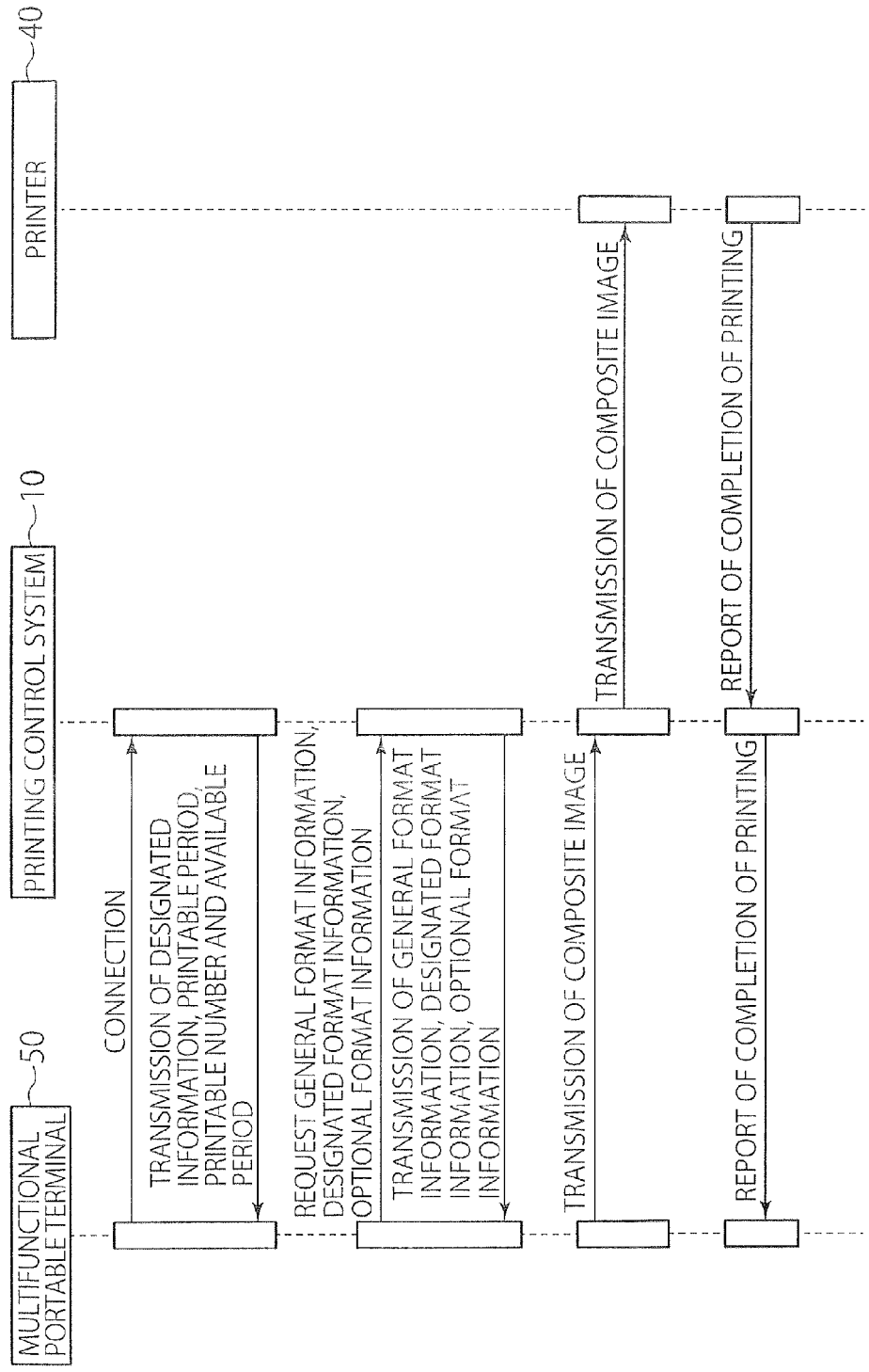
FIG. 16 is a sequence view showing a procedure of printing an image, in the fourth embodiment of the present invention.
Figure 17:
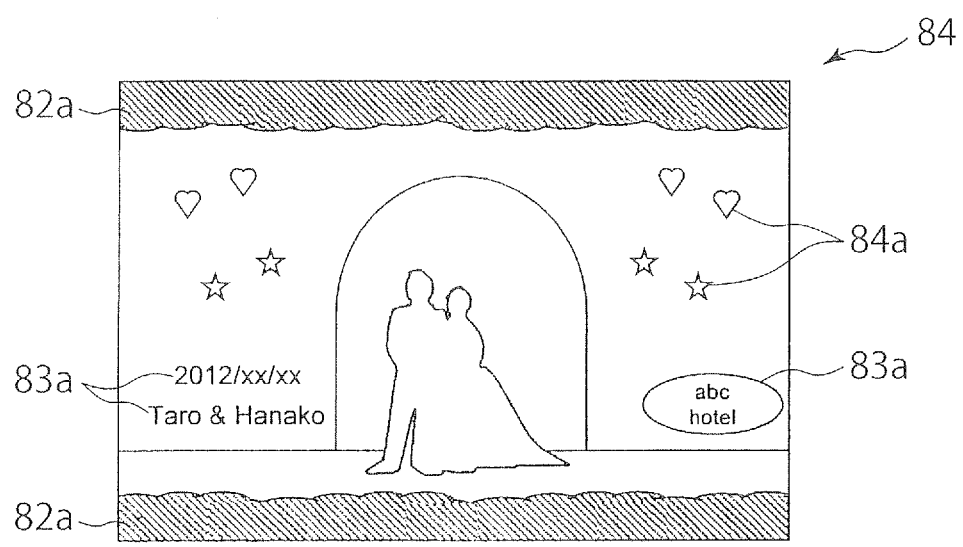
FIG. 17 is a view showing an example of a third composite image obtained in the fourth embodiment of the present invention.

A fourth embodiment of the present invention is described with reference to FIGS. 15 to 17. In the fourth embodiment shown in FIGS. 15 to 17, a composite-image obtaining unit 65 of a control device 60 of the multifunctional portable terminal 50 is configured to form a composite image by combining an image selected in the multifunctional portable terminal 50 and predetermined format information with each other. In the fourth embodiment shown in FIGS. 15 to 17, the same parts as those of the first embodiment shown in FIGS. 1 to 10 are shown by the same reference numbers, and detailed description thereof is omitted.

Control Device of Multifunctional Portable Terminal

At first, there is described an example of a structure of the control device 60 of the multifunctional portable terminal 50 in this embodiment is described. In this embodiment, the composite-image obtaining unit 65 of the control device 60 includes a format-information management unit 65f configured to manage format information, and a composite-image forming unit 65b configured to form a composite image by combining an image and format information with each other. The format-information management unit 65f includes a general-format-information management unit 65c configured to manage general format information, a designated-format-information management unit 65d configured to manage designated format information, and an optional-format-information management unit 65e configured to manage optional format information. Herein, since the meanings of the "general format information", the "designated format information" and the "optional format information" are the same as those in the above first embodiment, detailed description thereof is omitted.

Method of Forming Composite Image

Next, an example of a method of forming a composite image is described with reference to FIGS. 16 and 17. For example, the composite-image obtaining unit 65 of the multifunctional portable terminal 50 makes a request to the printing control system 10 for optional format information held by the printing control system 10. In accordance with the request from the multifunctional portable terminal 50, the printing control system 10 transmits optional format information recorded in an optional-format-information recording unit 35g of a recording device 35, to the multifunctional portable terminal 50. When there are general format information or designated format information recorded in the printing control system 10 and a participant can freely select either the general format information or the designated format information, the composite-image obtaining unit 65 may make a request to the printing control system 10 for the general format information or the designated format information.

By using the composite-image forming unit 65b of the composite-image obtaining unit 65, a user (participant) can freely combine the format information having been transmitted from the printing control system 10, with an image selected by him/her. For example, as indicated by the reference number 84a in FIG. 17, when the optional format information includes patterns such as a heart mark and a star mark, a participant can locate the optional format information 84a on a given position. Thus, a third composite image 84 formed by combining the image and the optional format information with each other can be obtained in the multifunctional portable terminal 50. The obtained third composite image 84 may be recorded in the recording device 52. When a participant forms a composite image with the use of the composite-image forming unit 65b, the output device 54 may display a composite image in which the image is combined with, not only the optional format information 84a, but also the general format information 82a and/or the designated format information 83. In addition, as described above, when there are the general format information and the designated format information, a participant may freely select, not only the optional format information, but also the general format information or the designated format information.

Thereafter, the third composite image 84 obtained in the multifunctional portable terminal 50 is transmitted to the printing control system 10, and is printed by the printer 40.

According to this embodiment, the composite-image obtaining unit 65 of the control device 60 of the multifunctional portable terminal 50 can form a composite image just as a participant intended, in accordance with an instruction from the participant. Thus, an entertainment property of the printing system 1 and a value of a printed image can be enhanced.

In this embodiment, there is described the example in which a composite image is formed in the multifunctional portable terminal 50, with the use of the composite-image obtaining unit 65 of the control device 60 of the multifunctional portable terminal 50. However, as long as an intention of a participant as to a desired composite image can be reflected, a place where the composite image is actually formed is not limited to the inside of the multifunctional portable terminal 50. For example, a participant may determine a type and a position of format information to be combined with an image by using the composite-image obtaining unit 65 of the control device 60. Meanwhile, a process in which the image and the optional format information are combined with each other may be performed inside the printing control system 10.

Fifth Embodiment

Figure 18:
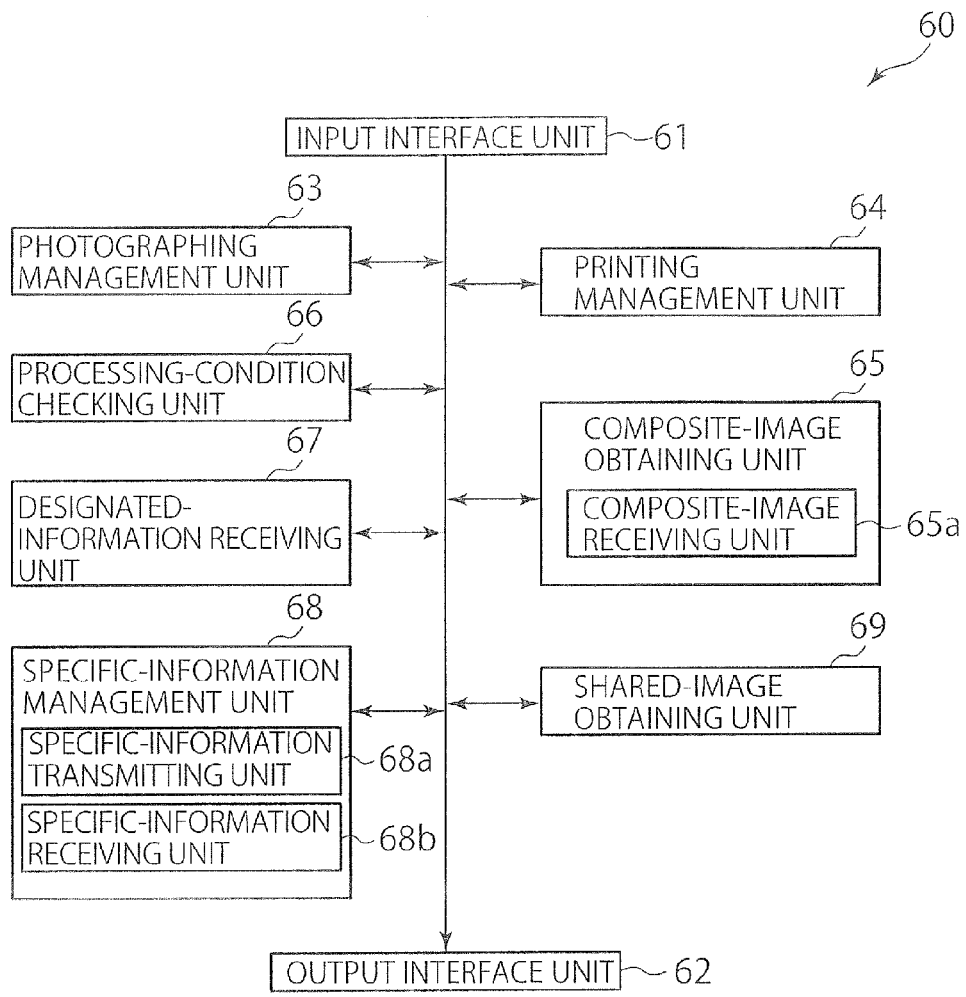
FIG. 18 is a view showing a control device of a multifunctional portable terminal, in a fifth embodiment of the present invention.

Next, a fifth embodiment of the present information is described with reference to FIGS. 18 and 19. In the fifth embodiment shown in FIGS. 18 and 19, the control device 60 of the multifunctional portable terminal 50 further includes a shared-image obtaining unit 69 configured to obtain an image recorded in the printing control system 10. In the fifth embodiment shown in FIGS. 18 and 19, the same parts as those of the first embodiment shown in FIGS. 1 to 10 are shown by the same reference numbers, and detailed description thereof is omitted.

As described above, some participants may hope to see or print an image taken by another participant, or may hope to store an image taken by another participant in his/her multifunctional portable terminal 50. In order to cope with these hopes, the shared-image obtaining unit 69 of the multifunctional portable terminal 50 is configured to see and print an image recorded in the received-image recording unit 35*a* of the recording device 35 of the printing control system 10, and to store such an image in a multifunctional portable terminal 50 having the shared-image obtaining unit 69.

Figure 19:
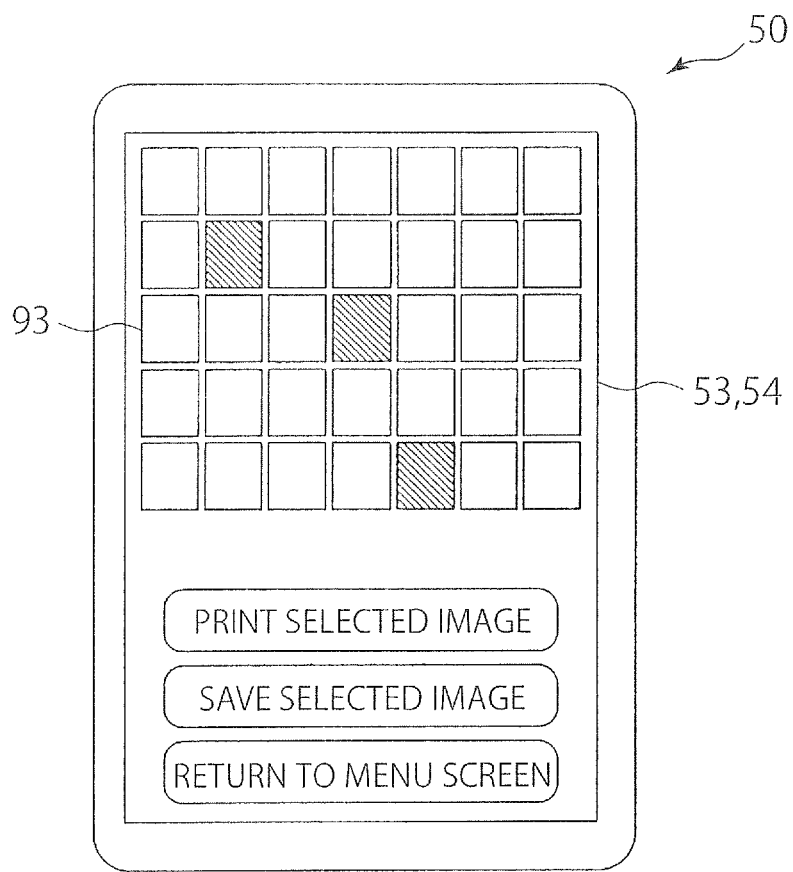
FIG. 19 is a view showing a multifunctional portable terminal on which images recorded in the printing control system are displayed.

Herebelow, there is described an example of a method by which a participant prints an image recorded in the received-image recording unit 35*a* of the recording device 35 of the printing control system 10, with reference to FIG. 19. At first, by using the shared-image obtaining unit 69, a participant causes the output apparatus 54 of the multifunctional portable terminal 50 to display some or all of images 93 recorded in the received-image recording unit 35*a* of the printing control system 10. At this time, the printing control system 10 may transmit all the data of the respective images 93 to the multifunctional portable terminal 50, or may transmit only data which substantially correspond to a resolution that is required when the images 93 are listed on the output device 54 of the multifunctional portable terminal 50. Then, a participant selects an image 93 desired to be printed, from among the images 93 displayed on the output apparatus 54. In FIG. 19, the images 93 selected by the participant are hatched. Thereafter, the images 93 selected by the participant are transmitted to the printing control system 10. In this manner, the participant can causes the printer 40 to print the images 93 recorded in the printing control system 10.

Sixth Embodiment

A sixth embodiment of the present invention is described with reference to FIGS. 20 to 22. In the sixth embodiment shown in FIGS. 20 to 22, the printing control system 10 and the multifunctional portable terminal 50 are configured such that shared information recorded in the respective multifunctional portable terminals 50 can be easily and promptly shared among the respective multifunctional portable terminals 50. In the sixth embodiment shown in FIGS. 20 to 22, the same parts as those of the first embodiment shown in FIGS. 1 to 10 are shown by the same reference numbers, and detailed description thereof is omitted.

Control Device of Multifunctional Portable Terminal

At first, there is described an example of a structure of a control device 60 of a multifunctional portable terminal 50 in this embodiment is described. As shown in FIG. 21, the control device 60 further includes a shared-information management unit 70 configured to manage shared information. The "shared information" herein means information peculiar to each multifunctional portable terminal 50, the information being desired by a certain user of a certain multifunctional portable terminal 50 to be shared by or exchanged with another user of another multifunctional portable terminal 50. For example, the shared information may include personal information of a user of a multifunctional portable terminal 50, such as a name, a mail address or a telephone number. In addition, the shared information may include information announcing to which degree a user of each multifunctional portable terminal 50 uses the printing system 1 in the event hall, such as information relating to an image having been printed by the user of the multifunctional portable terminal 50 and information relating to an image that is being printed.

Figure 21:
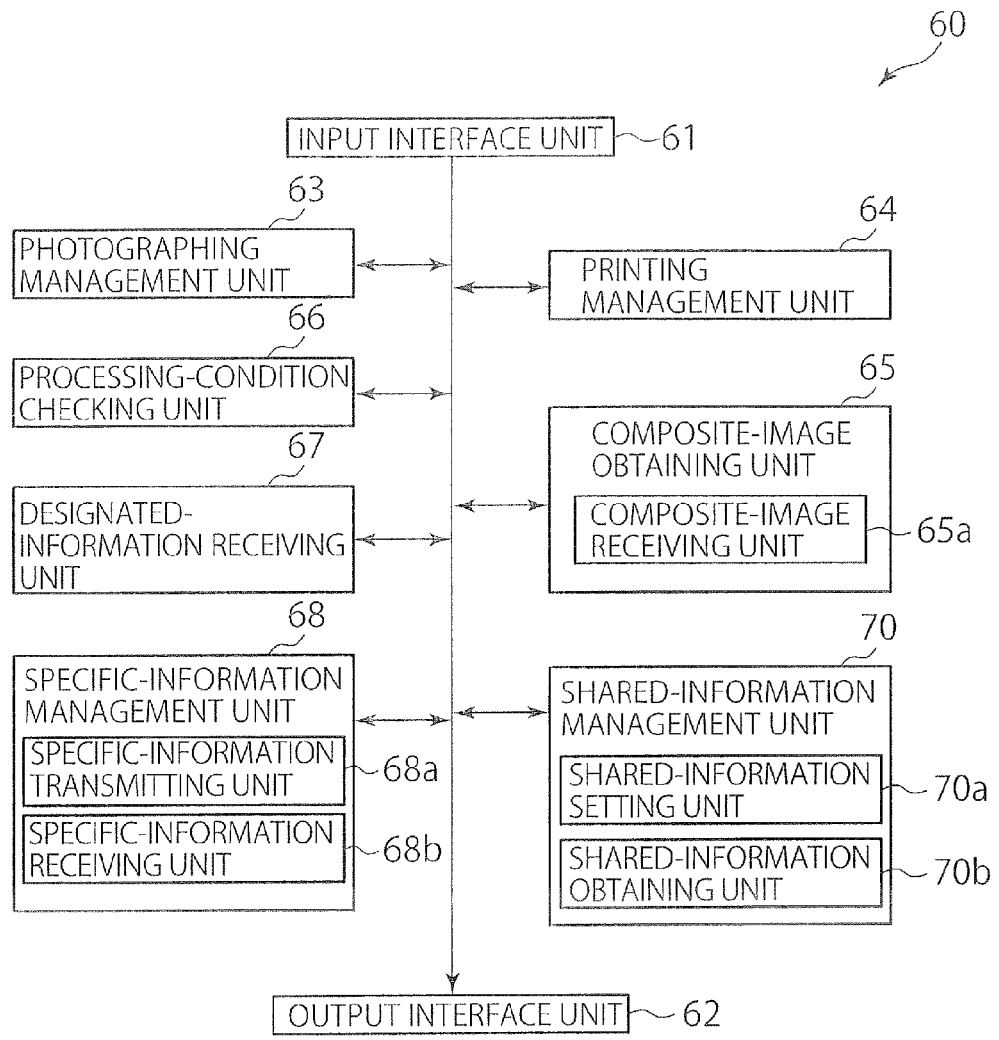
FIG. 21 is a control device of a multifunctional portable terminal, in the sixth embodiment of the present invention.
Figure 22:
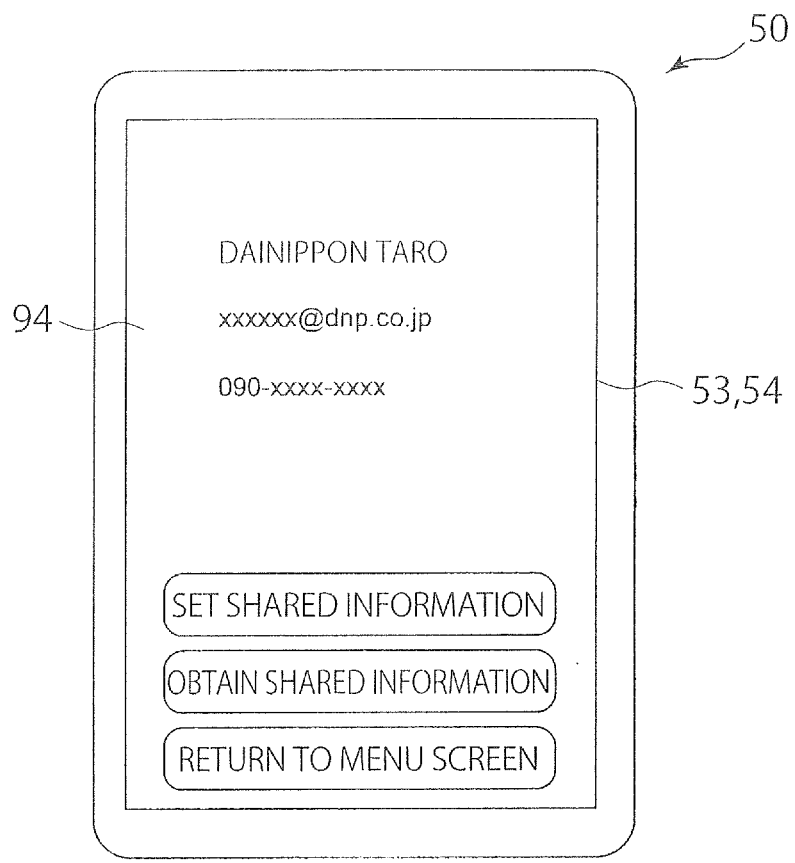
FIG. 22 is a view showing an example of a screen of a multifunctional portable terminal, on which shared information is set.

As shown in FIG. 21, the shared-information management unit 70 of the control device 60 of the multifunctional portable terminal 50 includes a shared-information setting unit 70*a* configured to set whether information peculiar to each multifunctional portable terminal 50 can be disclosed as shared information to the printing control system 10. As to the information peculiar to each multifunctional portable terminal 50, the shared-information setting unit 70*a* may be configured to define a range of the information, which can be disclosed as shared information to the printing control system 10. The shared-information management unit 70 may further include a shared-information obtaining unit 70*b* configured to obtain shared information which is set as shared information by another multifunctional portable terminal 50 and is managed by the below-described shared-information management unit 30 of the printing control system 10.

Control Device of Printing Control System

Figure 20:
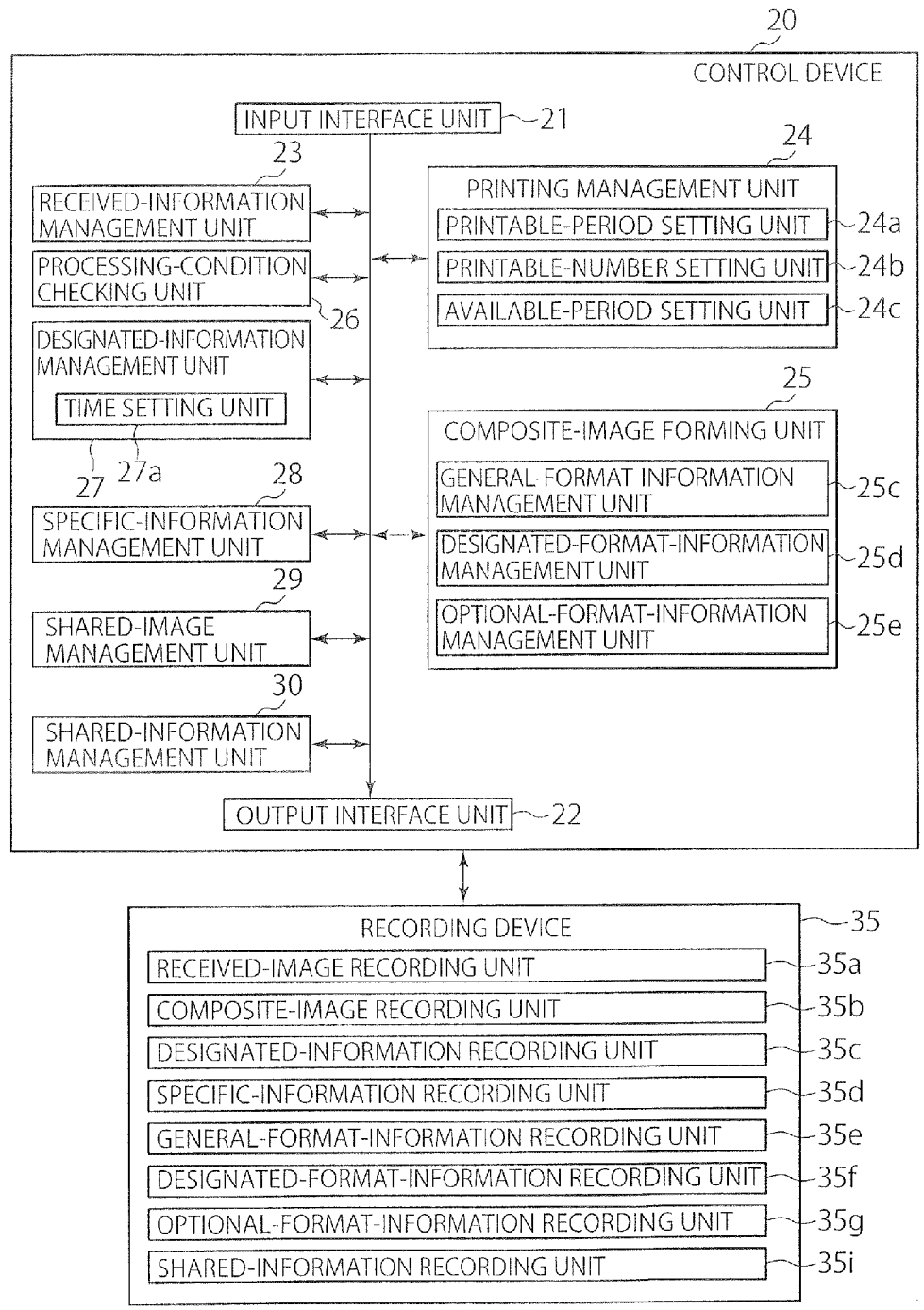
FIG. 20 is a view showing a control device of a printing control system, in a sixth embodiment of the present invention.

As shown in FIG. 20, the control device 20 of the printing control system 10 includes the shared-information management unit 30 configured to manage shared information that is transmitted from a multifunctional portable terminal 50 whose sharing setup is in force, among the multifunctional portable terminals 50. The shared information managed by the shared-information management unit 30 may be recorded in a shared-information recording unit 35*i* of the recording device 35. In addition, the shared-information management unit 30 may be configured to disclose or transmit the shared information to a multifunctional portable terminal 50 whose sharing setup is in force.

Herebelow, an example of a procedure of sharing information in this embodiment is described. At first, a user sets shared information in his/her multifunctional portable terminal 50, by using the shared-information setting unit 70*a* of the shared-information management unit 70. For example, as indicted by the reference number 94 in FIG. 22, a name, a mail address and a telephone number are set as shared information. The shared information 94 set in the multifunctional portable terminal 50 is transmitted toward the printing control system 10, and is managed by the shared-information management unit 30. The shared information managed by the shared-information management unit 30 is disclosed or transmitted to another multifunctional portable terminal 50 whose sharing setup is in force. Thus, the respective participants in the event can exchange information, such as a name, a mail address, a telephone number and so on, within a range defined by himself/herself. Therefore, the information can be easily and promptly shared by or exchanged among the respective participants. The shared-information management unit 70 may be configured to automatically record information, such as a name obtained from another multifunctional portable terminal 50, in an address book of the multifunctional portable terminal 50.

When an image selected by a user is transmitted to the printing control system 10, all or a part of shared information, which is managed by the shared-information management unit of each multifunctional portable terminal 50, may be transmitted together with the image. In this case, the shared information transmitted to the printing control system 10 may be reflected on the image printing process in one way or another. For example, the shared information of a multifunctional portable terminal 50 which has transmitted the original image, such as a name, may be printed on a predetermined location on a printed picture. Alternatively, discharged pictures may be sorted in accordance with the shared information of each image. Thus, a participant can readily find a picture whose image has been transmitted by himself/herself and printed by the printer 40. In addition, the printing control system 10 may collate the shared information of an image, such as a name, with information such as a name of an event participant, which has been previously inputted in the printing control system 10. Thus, the printing control system 10 can check whether an image transmitted thereto is transmitted from a multifunctional portable terminal 50 of an event participant or not. In this case, the printing control system 10 may exclude an image transmitted from a multifunctional portable terminal 50 whose owner is not an event participant, from an item to be printed.

Seventh Embodiment

Figure 23:
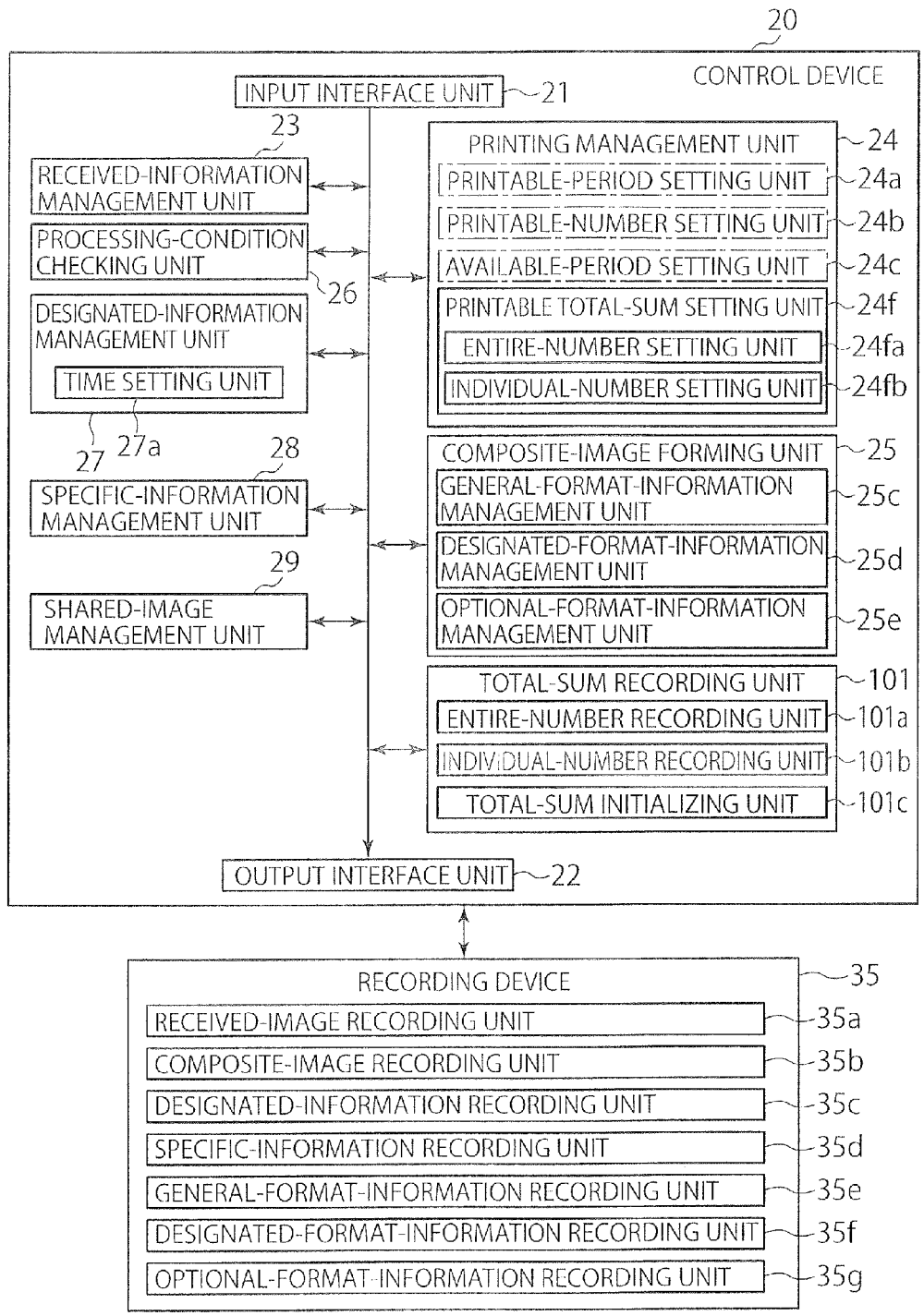
FIG. 23 is a view showing a control device of a printing control system, in a seventh embodiment of the present invention.
Figure 24:
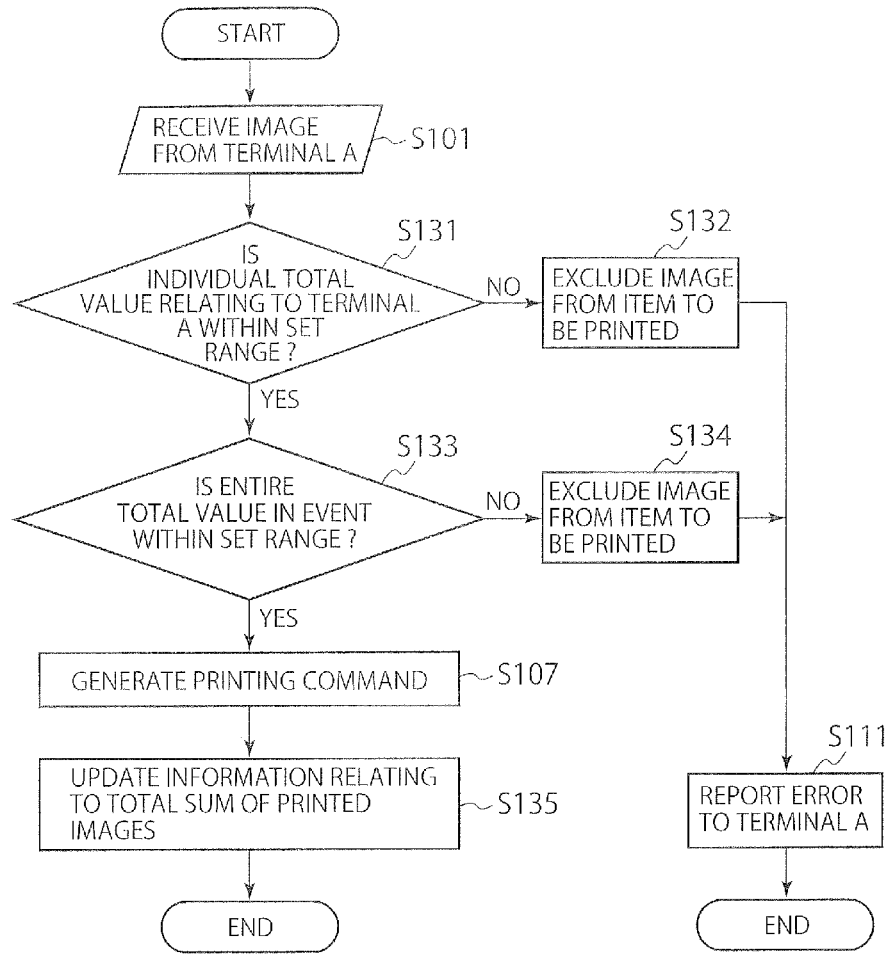
FIG. 24 is a flowchart showing a procedure along which the control device of the printing control system generates a printing command, in the seventh embodiment of the present invention.

Next, there is described a seventh embodiment of the present invention with reference to FIGS. 23 and 24. In the seventh embodiment shown in FIGS. 23 and 24, there is described an example in which a restriction process based on a total sum of image(s) printed by the printer 40 is performed. In the seventh embodiment shown in FIGS. 23 and 24, the same parts as those of the first embodiment shown in FIGS. 1 to 10 are shown by the same reference numbers, and detailed description thereof is omitted.

Control Device of Printing Control System

At first, there is described an example of a structure of a control device 20 of a printing control system 10 in this embodiment. As shown in FIG. 23, a printing management unit 24 of the control device 20 includes a printable total-sum setting unit 24$f$ configured to set a total sum of images that can be printed by the printer 40. As shown by the one-dot chain lines in FIG. 23, the printing management unit 24 may further include any one of a printable-period setting unit 24$a$, a printable-number setting unit 24$b$ and an available-period setting unit 24$c$, or a combination thereof.

As shown in FIG. 23, the printable total-sum setting unit 24$f$ includes an entire-number setting unit 24$fa$ configured to set a total sum of images that can be printed by the printer 40 during a certain event. In addition, the printable total-sum setting unit 24$f$ may further include an individual-number setting unit 24$fb$ configured to set a total sum of images that can be printed by the printer 40 based on a command of a certain multifunctional portable terminal 50.

In addition, as shown in FIG. 23, the control device 20 may further include a total-sum recording unit 101 configured to record a total sum of images printed by the printer 40 during a certain event. For example, the total-sum recording unit 101 has an entire-number recording unit 101$a$ configured to record the entire number of images printed by the printer 40, and an individual-number recording unit 101$b$ configured to record the number of images printed by the printer 40 for each multifunctional portable terminal 50. The total-sum recording unit 101 may further have a total-sum initializing unit 101$c$ configured to initialize a total sum recorded in the entire-number recording unit 101$a$ and a total sum recorded in the individual-number recording unit 101$b$, i.e., to make zero the recorded total sums, for each time when an available period of a printing system 1 terminates. Alternatively, information relating to a total sum of images printed by the printer 40 may be recorded in a recording device 35.

In order that the number of images printed by the printer 40 is recorded for each multifunctional portable terminal 50, the control device 20 of the printing control system 10 is required to respectively recognize a plurality of multifunctional portable terminals 50 connected to the printing control system 10. A method by which the printing control system 10 can recognize the multifunctional portable terminals 50 is not particularly limited. It is possible to recognize the multifunctional portable terminals 50 by using a hardware address, a so-called MAC address of each multifunctional portable terminal 50, a manufacturer's name of each multifunctional portable terminal 50 and a model title thereof. In addition, it is possible to recognize the multifunctional portable terminals 50 by using an IP address assigned to each multifunctional portable terminal 50 in a local area network.

Printing Control Method

Next, an operation and an effect of this embodiment as structured above are described. In an example shown herein, a total sum of images that can be printed by the printer 40 during a certain event, and a total sum of images that can be printed by the printer 40 based on a command of a certain multifunctional portable terminal 50 are set beforehand in the entire-number setting unit 24$fa$ and the individual-number setting unit 24$fb$. For example, a total sum of images that can be printed by the printer 40 from 9:00 to 12:00, which is an available period of the printing control system 10, is set as fifty. In addition, a total sum of images that can be printed by the printer 40 based on a command of a certain multifunctional portable terminal 50 is set as three, on the assumption that the number of participants in the event is about twenty.

As shown in FIG. 24, the printing control system 10 firstly receives a selected image transmitted from a terminal A, and records the selected image as a received image in the recording device 35. Thereafter, the printing management unit 24 of the control device 20 of the printing control system 10 performs printing command steps (S131, S133) in which a printing command for printing the received image by using the printer 40 is judged to be generated or not.

In the printing command step, there is firstly performed a step S131 in which a total value (hereinafter referred to also as "individual total value") of a total sum of images printed by the printer 40 based on a command of a certain terminal A during an event and the number of selected image(s) transmitted at this time from the terminal A is judged to be within the number set in the individual-number setting unit 24$fb$ of the printable total-sum setting unit 24$f$ or not. When the individual total value relating to the terminal A is out of the number set in the individual-number setting unit 24$fb$, e.g., the individual total value is four, the image transmitted at this time from the terminal A is excluded from an item to be printed (S132).

On the other hand, a case where the individual total value relating to the terminal A is not more than the number set in the individual-number setting unit 24$fb$ is described. In this case, in the printing command step, there is performed a step S133 in which a total value (hereinafter referred to also as "entire total value") of a total sum of images printed by the printer 40 during the event and the number of selected image(s) transmitted at this time from the terminal A is judged to be within the number set in the entire-number setting unit 24$fa$ of the printable total-sum setting unit 24$f$ or not. When the entire total value is out of the number set in the entire-number setting unit 24fa, e.g., the entire total value is fifty one, the image transmitted at this time from the terminal A is excluded from an item to be printed (S134).

On the other hand, when the entire total value is not more than the number set in the entire-number setting unit 24fa, the printing management unit 24 determines that the image transmitted from the terminal A is to be printed. Then, the printing management unit 24 generates a printing command (S107). Thus, the image transmitted from the terminal A is transmitted, as an item to be printed, to the printer 40. Thereafter, based on the aforementioned individual total value and the entire total value, the numbers recorded in the entire-number recording unit 101a of the total-sum recording unit 101 and the individual-number recording unit 101b thereof are updated. Namely, the number of image(s) to be printed at this time is added to the number of images recorded in the entire-number recording unit 101a, and is added to the number of images recorded in the individual-number recording unit 101b relating to the terminal A.

After the available period of the printing system 1 has terminated, the total-sum initializing unit 101c makes zero the total sums recorded in the entire-number recording unit 101a and the individual-number recording unit 101b. Thus, when the printing control system 10 and the aforementioned terminal A are used in another event to be held on the next day, for example, the printer 40 can print an image without being influenced by a total sum of images printed on the previous day.

According to this embodiment, the printing management unit 24 of the control device 20 includes the entire-number setting unit 24fa configured to set a total sum of images that can be printed by the printer 40 during a certain event. Thus, an upper limit of a total sum of images that can be printed by the printer 40 during a certain event can be determined. Accordingly, when an owner leases the printing system 1 to an event organizer, for example, the owner can preset a rental expense of the printing system 1 correspondingly to a total sum of images to be printed. That is to say, a rental expense can be set more easily and more flexibly.

Further, when the above-described individual-number setting unit 24fb is provided, it can be prevented that only a few participants print a great deal of images. Thus, no participant can be treated unfairly in terms of the number of printed images.

Eighth Embodiment

Figure 25:
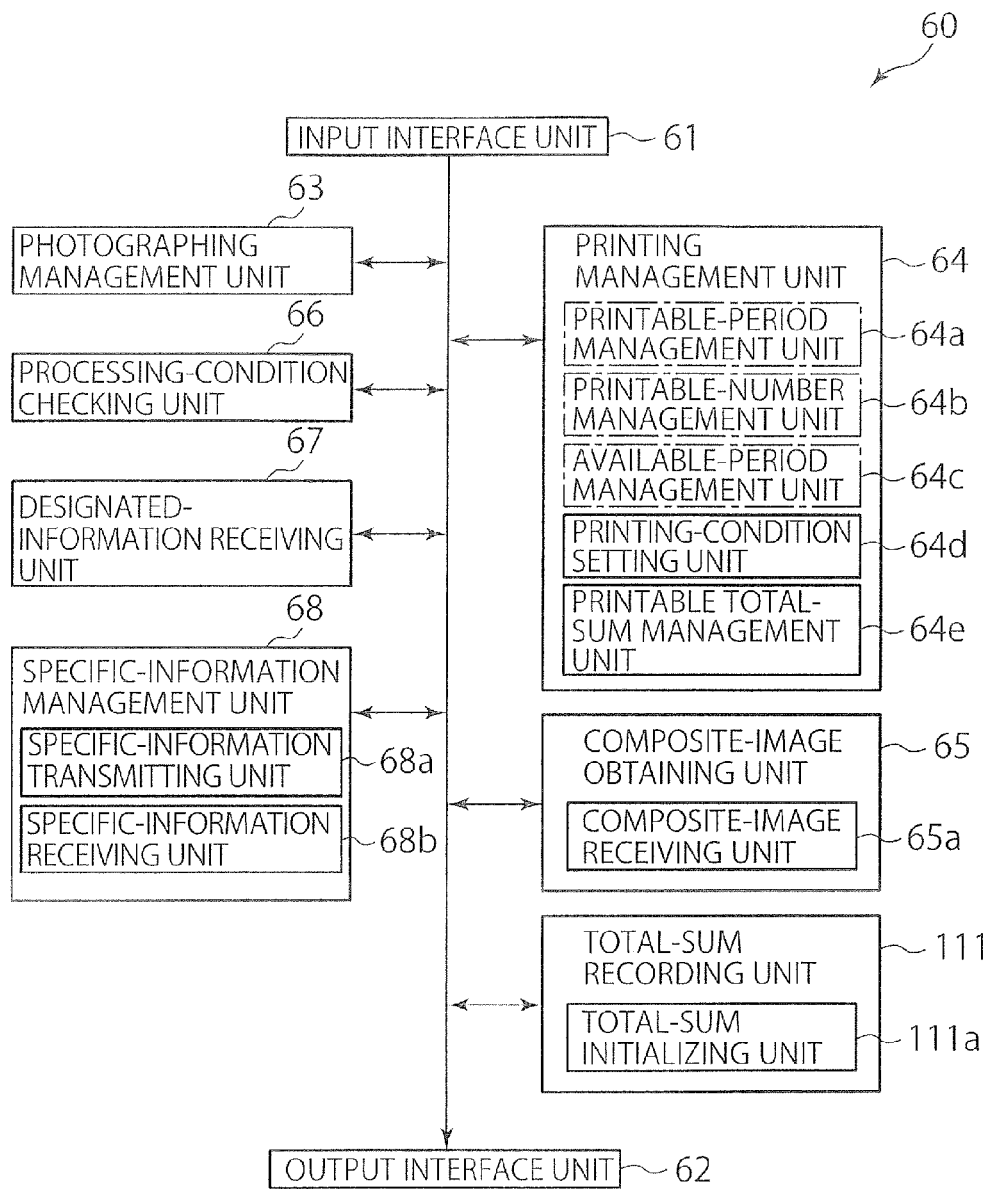
FIG. 25 is a view showing a control device of a multifunctional portable terminal, in an eighth embodiment of the present invention.
Figure 26:
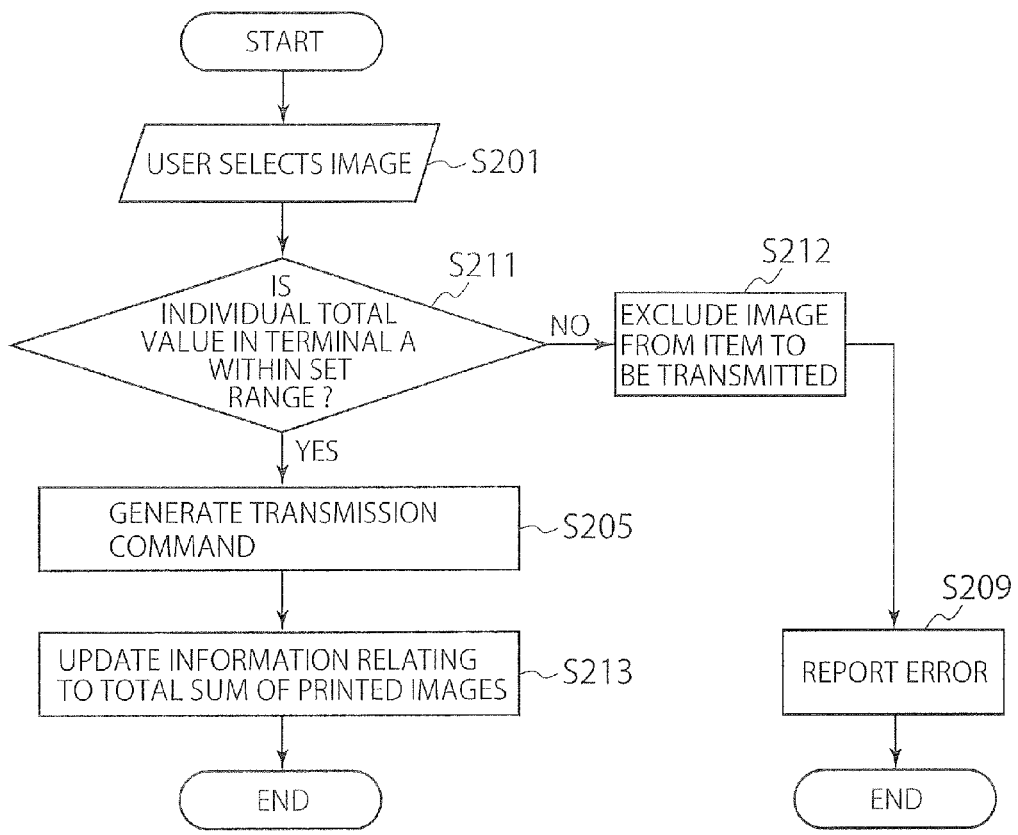
FIG. 26 is a flowchart showing a procedure along which the control device of the multifunctional portable terminal generates a transmission command, in the eighth embodiment of the present invention.

Next, there is described an eighth embodiment of the present invention with reference to FIGS. 25 and 26. In the eighth embodiment shown in FIGS. 25 and 26, there is described an example in which the restriction process based on a printable total sum, which is performed by the printing control system 10 in the above seventh embodiment, is performed by a multifunctional portable terminal 50. In the eighth embodiment shown in FIGS. 25 and 26, the same parts as those of the first embodiment and the seventh embodiment are shown by the same reference numbers, and detailed description thereof is omitted.

Control Device of Multifunctional Portable Terminal

At first, an example of a structure of a control device 60 of a multifunctional portable terminal 50 in this embodiment is described. In this embodiment, a printing management unit 64 of the control device 60 includes a printable total-sum management unit 64e configured to manage information relating to a total sum of images that can be printed by a printer 40 based on a command of a certain multifunctional portable terminal 50. As shown by the one-dot chain lines in FIG. 25, the printing management unit 64 may further include any one of a printable-period setting unit 64a, a printable-number setting unit 64b and an available-period setting unit 64c, or a combination thereof.

In addition, the control device 60 may further include a total-sum recording unit 111 configured to record a total sum of image(s) printed by the printer 40 based on a command of each multifunctional portable terminal 50. The total-sum recording unit 111 may further include a total-sum initializing unit 111a configured to initialize a total sum recorded in the total-sum recording unit 111, i.e., to make zero the recorded total sum, for each time when an available period of a printing system 1 terminates. Alternatively, information relating to a total sum of images printed by the printer 40 may be recorded in a recording device 52.

Printing Method

Next, a printing method in this embodiment is described. (Method of Activating Application)

At first, participants activate an installed application. As described in the above first embodiment, upon activation of the application, the control device 60 of each multifunctional portable terminal 50 tries connection to the printing control system 10. After the multifunctional portable terminal 50 has been connected to the printing control system 10 through the wireless router 6, the control device 20 of the printing control system 10 transmits information relating to a total sum of images that can be printed by the printer 40 based on a command of a certain multifunctional portable terminal 50 (hereinafter referred to as "individual printable total sum") to each multifunctional portable terminals 50. Then, the printing-condition setting unit 64d of the printing management unit 64 of the control device 60 of each multifunctional portable terminal 50 sets the individual printable total sum, which has been transmitted from the printing control system 10, in the printable total-sum management unit 64e.

In the above example, there is described the example in which the information relating to the individual printable total sum stored in the printing control system 10 is transmitted from the printing control system 10 to the respective multifunctional portable terminals 50 on the initiative of the printing control system 10. However, not limited thereto, when each multifunctional portable terminal 50 recognizes a position of the printing control system 10 that stores the information relating to the individual printable total sum, e.g., an address thereof, for example, each multifunctional portable terminal 50 may voluntarily obtain the information relating to the individual printable total sum, after the multifunctional portable terminal 50 has been connected to the printing control system 10. Thereafter, the printing-condition setting unit 64d of the printing management unit 64 of the control device 60 of the multifunctional portable terminal 50 sets the individual printable total sum, which was initiatively obtained by itself, in the printable total-sum management unit 64e.

A fixed value may be set beforehand in the printable total-sum management unit 64e. In this case, even if a multifunctional portable terminal 50 fails in connecting to the printing control system 10 upon activation of the application, a restriction process based on the printable total-sum management unit 64e, which will be described below, can be performed.

(Method of Transmitting Image)

Next, a method of transmitting an image selected by a user (participant) toward the printing control system 10 is described with reference to FIG. 26. The method is performed by the control device 60 of a certain multifunctional portable terminal 50 (hereinafter also referred to as "terminal A") of the plurality of multifunctional portable terminals 50.

At first, an image to be desired to be printed is selected, from among images recorded in the recording apparatus 52, by a participant through the input device 53 (step S201). Then, the printing management unit 64 of the control device 60 of the terminal A performs a transmission command step (S211) in which whether a transmission command for transmitting the image thus selected (selected image) is transmitted to the printing control system 10 is judged to be generated or not.

In the transmission command step, there is performed a step S211 in which whether a total value of a total sum of image(s) printed by the printer 40 based on a command of the terminal A during an event and the number of image(s) selected by the participants through the input apparatus 53 is judged to be within the number set in the printable total-sum management unit 64e or not. When the total value is out of the number set in the printable total-sum management unit 64e, the selected image is excluded from an item to be printed (S212).

On the other hand, when the total value is not more than the number set in the printable total-sum management unit 64e, the printing management unit 64 generates a transmission command relating to the selected image (S205). Thus, the selected image is transmitted to the printing control system 10. Meanwhile, when there is a selected image that has been excluded from an item to be printed in the above respective steps, the fact may be displayed on the output device 54 (S209).

Thereafter, the number recorded in the total-sum recording unit 111 is updated based on the above-described total value. Namely, the number of images as items to be printed at this time is added to the number recorded in the total-sum recording unit 111.

After the available period of the printing system 1 has terminated, the total-sum initializing unit 111a of the total-sum recording unit 111 may make zero the total sum recorded in the total-sum recording unit 111. Thus, when the terminal A is used in another event to be held on the next day, for example, the printer 40 can print an image without being influenced by a total sum of images printed on the previous day.

According to this embodiment, the restriction process relating to a total sum of images to be printed that is allowed for a certain multifunctional portable terminal 50 is performed not by the printing control system 10 but by the multifunctional portable terminal 50. Thus, the restriction process relating to a total sum of images to be printed can be performed for each multifunctional portable terminal 50, without increasing a load on the printing control system 10.

In the aforementioned seventh and eighth embodiments, the printing control system 10 may be provided with a warning unit configured to give warning to a multifunctional portable terminal 50, when the number recorded in the total-sum recording unit 101 of the printing control system 10 or the total-sum recording unit 111 of the multifunctional portable terminal 50 approaches the number set in the printable total-sum setting unit 24f of the printing control system 10 or the printable total-number management unit 64e of the multifunctional portable terminal 50.

Ninth Embodiment

Figure 27:
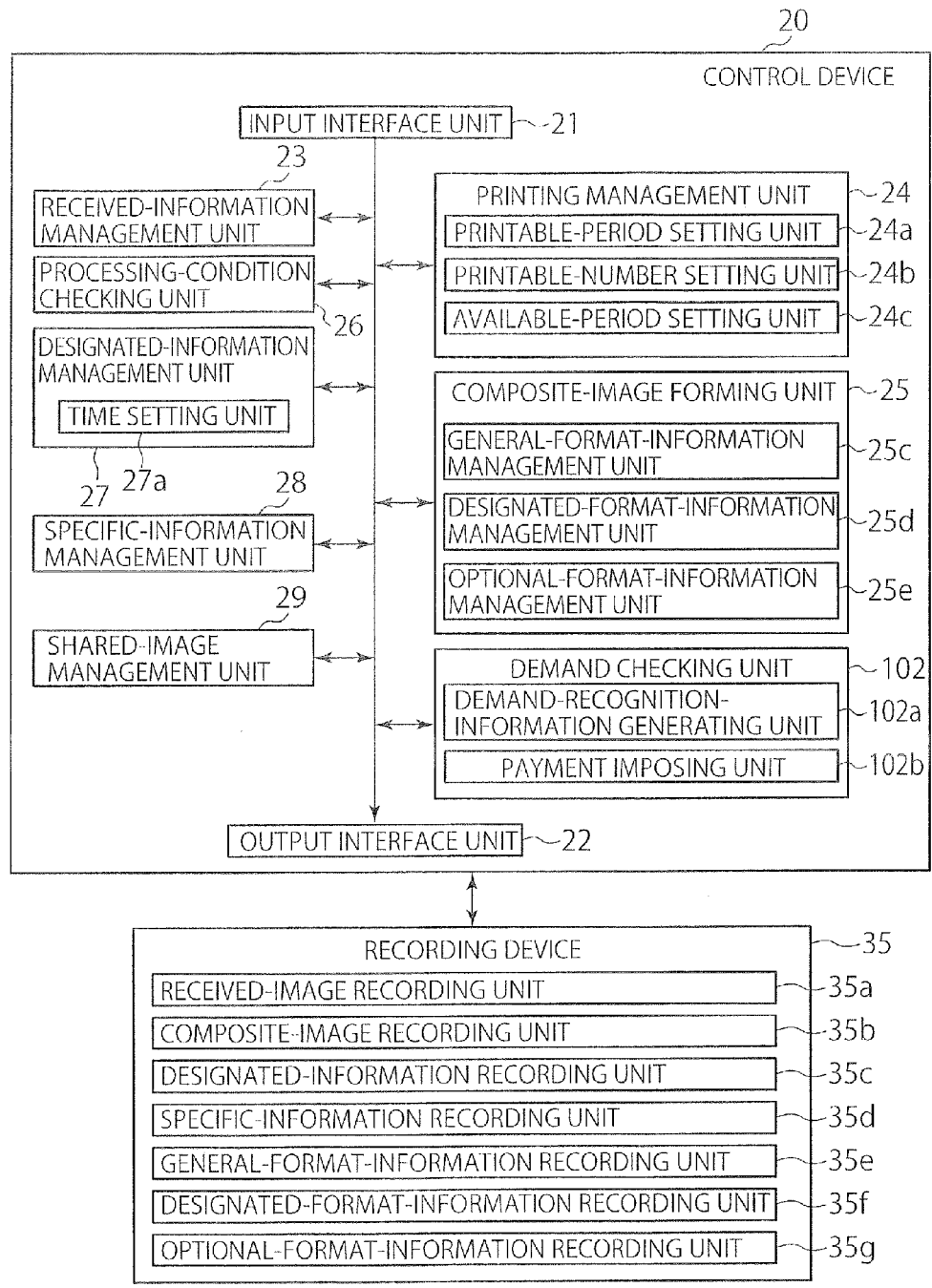
FIG. 27 is a view showing a control device of a printing control system, in a ninth embodiment of the present invention.

Next, a ninth embodiment of the present invention is described with reference to FIG. 27. In the ninth embodiment shown in FIG. 27, the printing control system 10 is structured such that, before a printing process, an intent of a user of the multifunctional portable terminal 50, who is going to use the printer 40, can be checked or that a payment can be imposed on the user. In the ninth embodiment shown in FIG. 27, the same parts as those of the first embodiment shown in FIGS. 1 to 10 are shown by the same reference numbers, and detailed description thereof is omitted.

Control Device of Printing Control System

At first, there is described an example of a structure of a control device 20 of a printing control system 10 in this embodiment. As shown in FIG. 27, the control device 20 includes a demand checking unit 102 configured to check a demand of a multifunctional portable terminal 50 which has transmitted an image to the printing control system 10, i.e., the multifunctional portable terminal 50 which has demanded printing of the image. The demand checking unit 102 has a demand-recognition-information generating unit 102a configured to generate demand recognition information for recognizing a demand from the multifunctional portable terminal 50. In addition, the demand checking unit 102 may further have a payment imposing unit 102b configured to perform a payment imposing process on a user of the multifunctional portable terminal 50 depending on contents of the demand from the multifunctional portable terminal 50.

Printing Control Method

Next, an operation and an effect of this embodiment as structured above are described. Firstly, the printing control system 10 receives a selected image transmitted from a certain multifunctional terminal 50 (hereinafter referred to also as "terminal A") of a plurality of multifunctional portable terminals 50, with the use of the communication device 15. Then, the demand-information-information generating unit 102a of the demand checking unit 102 of the control device 20 generates demand recognition information related to the selected image transmitted from the terminal A. A format of the demand recognition information is not particularly limited. For example, the demand recognition information may be a predetermined letter string related to the selected image transmitted from the terminal A, e.g., a password or a receipt number, or may be coded information such as a bar code or a QR code. Thereafter, the generated demand recognition information is transmitted from the printing control system 10 to the terminal A. At this stage, a printing command relating to the image received from the terminal A is not generated.

When the terminal A receives the aforementioned demand recognition information, the demand recognition information is displayed on the output device 54 of the terminal A. At this time, a message promoting a user of the terminal A to input the demand recognition information to the printing control system 10 may be simultaneously displayed on the output device 54. For example, a message of "if you want printing of the image, input the displayed demand recognition information to the printing control system 10" may be displayed on the output device 54 simultaneously with the demand recognition information.

When the user of the terminal A wants printing of the image, the user walks up to a system operator who operates the printing control system 10, e.g., an event organizer, and says the received demand recognition information, e.g., the receipt number. Based on the receipt number, the system operator checks the contents of the data received from the user, e.g., the number of images and a size thereof. Thereafter, the system operator operates the printing control system 10 such that a printing command relating to the image received from the terminal A is generated. For example, the system operator inputs an instruction for generating a printing command relating to the image received from the terminal A, through the input device 13 of the printing control system 10. Inputting of the instruction for generating a printing command may be performed, not by the system operator, but by a user himself/herself. For example, after the system operator has checked the contents of the data received from the user, information for the above instruction, such as a password or a bar code, is transmitted to the terminal A. The user inputs the password to the input device 13 or causes the input device 13 to read the bar bode. Thus, a printing command relating to the image received from the terminal A can be generated.

When a payment is imposed on a user of a multifunctional portable terminal 50 for each time when an image is printed, the system operator firstly checks contents of the data received from the user, i.e., the number of images and a size thereof. Then, the system operator imposes a payment on the user depending on the contents of the data. For example, the payment imposing unit 102b of the demand checking unit 102 of the printing control system 10 or the system operator demands payment of a cost required for printing an image, from the user of the terminal A. After completion of the payment has been checked, the control device 20 generates a printing command automatically or based on an instruction from the system operator. A concrete payment method is not particularly limited. Payment by cash or payment by a credit card may be employed. After the payment has been checked, the system operator inputs an instruction for generating a printing command relating to the image received from the terminal A, through the input device 13 of the printing control system 10.

According to this embodiment, an intent of a user of a multifunctional portable terminal 50 can be checked or a payment can be imposed on the user, before the printing control system 10 causes the printer 40 to print an image having been transmitted from the multifunctional portable terminal 50. Thus, useless printing can be restrained. In addition, since checking of intent and payment imposition can be performed through the terminal A, it is not necessary to print a receipt number on a receipt. As a result, an operation cost of the printing control system 10 can be lowered, and resources can be saved.

Tenth Embodiment

Next, a tenth embodiment of the present invention is described with reference to FIGS. 28 and 29. In the tenth embodiment shown in FIGS. 28 and 29, a printing control system 10 and a multifunctional portable terminal 50 are structured such that communication between the printing control system and the multifunctional portable terminal 50 can be established more easily. In the tenth embodiment shown in FIGS. 28 and 29, the same parts as those of the first embodiment shown in FIGS. 1 to 10 are shown by the same reference numbers, and detailed description thereof is omitted.

Not only the printing control system 10 serving as a printing server but also the plurality of multifunctional portable terminals 50 are connected to a network established in an event hall. If IP addresses in the network are randomly assigned to the printing control system 10 and the respective multifunctional portable terminals 50, it is not easy for the multifunctional portable terminal 50 to find the printing control system 10 and to transmit an image to the printing control system 10.

In this case, there are two possible methods as described below, for example, as a method by which the multifunctional portable terminal 50 can easily find the printing control system 10. A first method is that an IP address of the printing control system 10 is set beforehand. For example, suppose that an IP address assigned to each equipment to be connected to the network is any one of addresses within a range of (A, B, C, 1) to (A, B, C, 200). In this case, an IP address of the printing control system 10 is preset at a fixed value such as (A, B, C, 100). In addition, event participants are informed beforehand of the fact that an equipment having an IP address in which the last figure is 100 is the printing control system 10. Alternatively, an application to be installed in each multifunctional portable terminal 50 may be caused to recognize that an equipment having an IP address in which the last figure is 100 is the printing control system 10.

Figure 28:
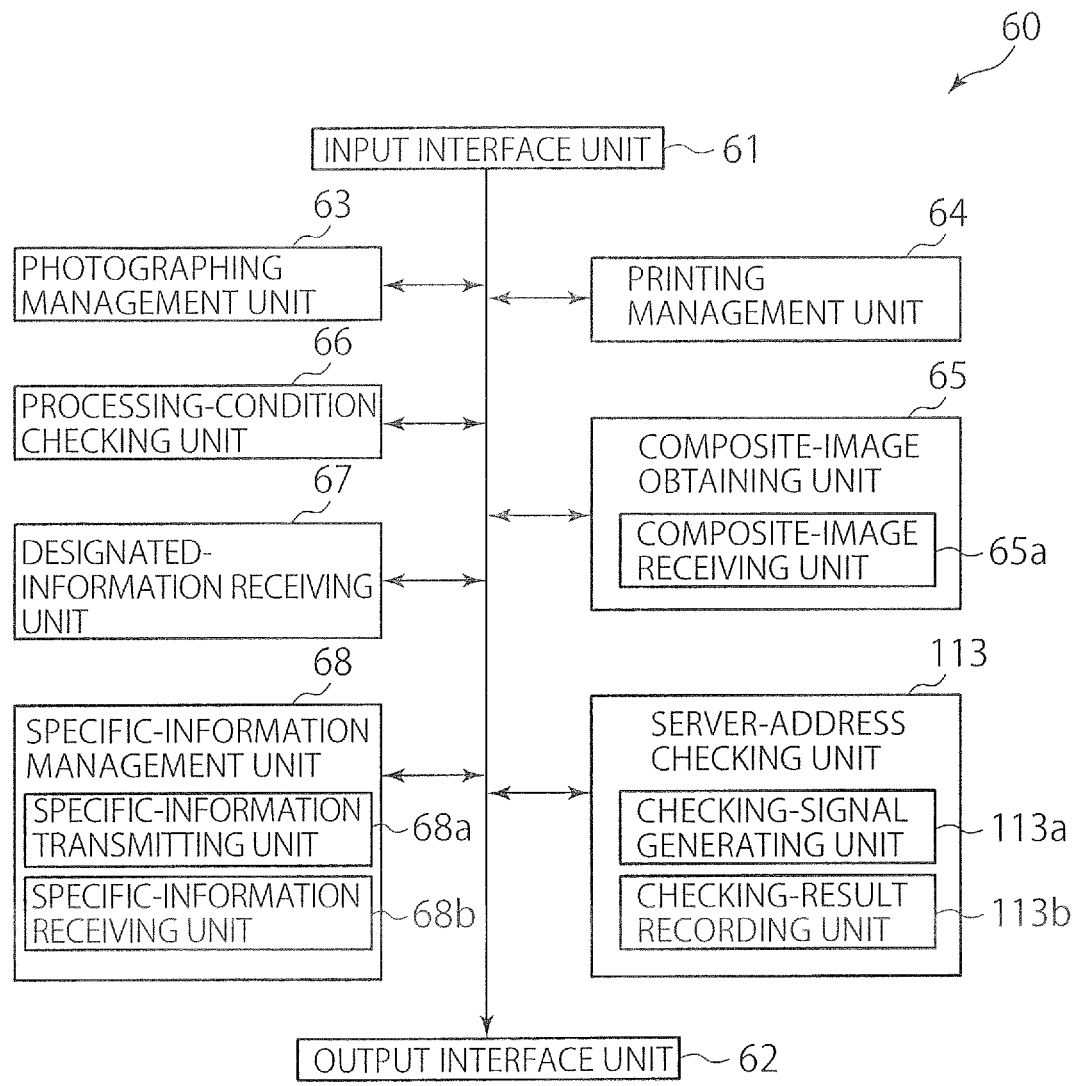
FIG. 28 is a view showing a control device of a multifunctional portable terminal, in a tenth embodiment of the present invention.
Figure 29:
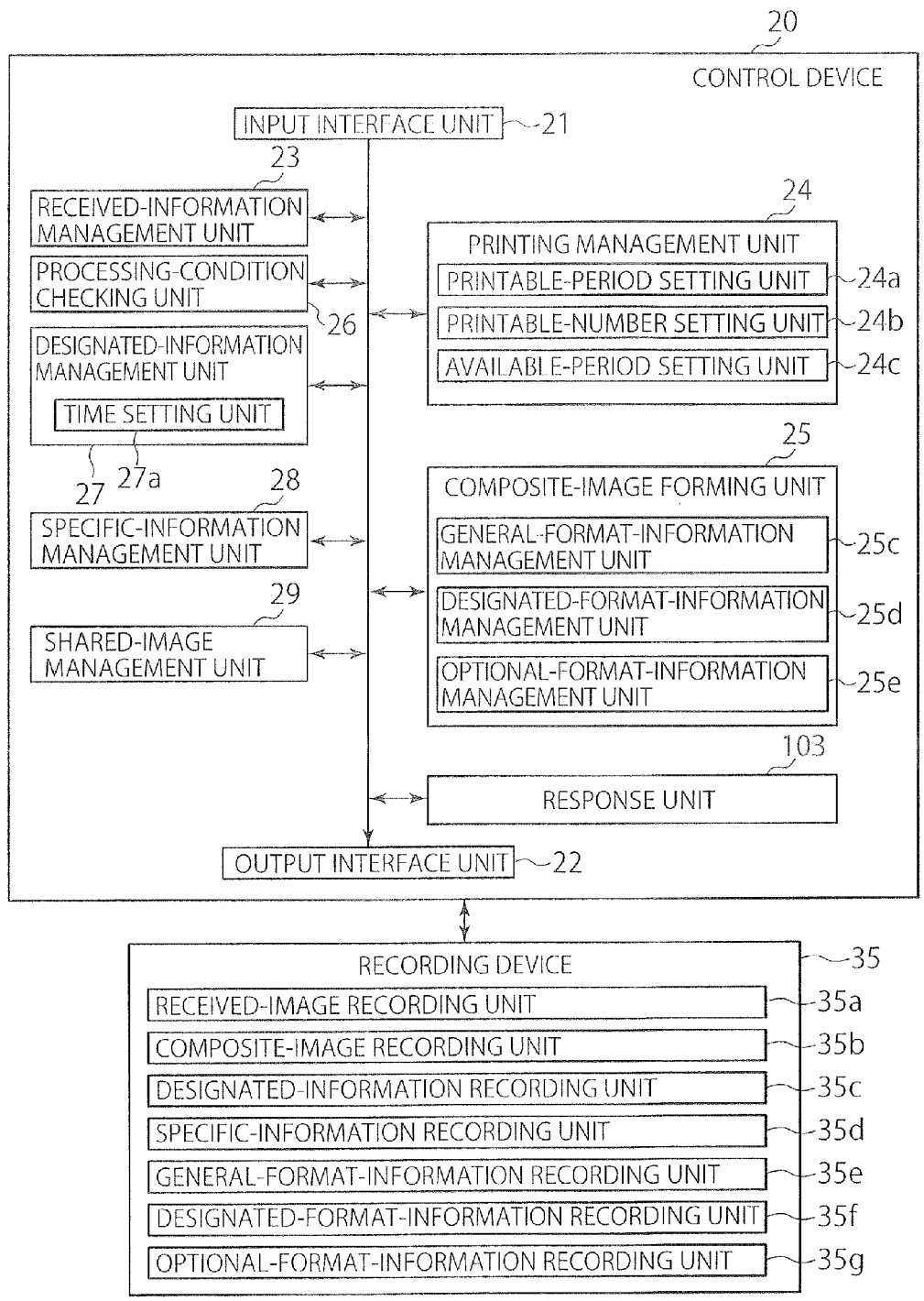
FIG. 29 is a view showing a control device of a printing control system, in the tenth embodiment of the present invention.

As shown in FIG. 28, a second method is that the control device 60 of each multifunctional portable terminal 50 is provided with a server-address checking unit 113 for checking which one of a plurality of equipments connected to the network is the printing control system 10. The server-address checking unit 113 includes a checking-signal generating unit 113a configured to generate a checking signal for checking the printing control system 10, and a checking-result recording unit 113b configured to record an IP address of the checked printing control system 10. In a case where this method is employed, as shown in FIG. 29, the control device 20 of the printing control system 10 includes a response unit 103 configured to transmit, upon receipt of the above-described checking signal transmitted from the multifunctional portable terminal 50, an IP address of the control device 20 to the multifunctional portable terminal 50.

An example of a communication establishment method when the aforementioned second method is employed is described. When a certain multifunctional portable terminal 50 (hereinafter referred to as "terminal A") of the plurality of multifunctional portable terminals 50 is connected to the network, the checking-signal generating unit 113a of the server-address checking unit 113 of the terminal A generates a checking signal. In addition, the terminal A transmits the checking signal to each equipment connected to the network. Then, since the response unit 103 of the printing control system 10 which has received the checking signal from the terminal A makes a response, the terminal A can receive the response and check the printing control system 10. Thus, the terminal A can recognize the printing control system 10. The printing control system 10 may transmit information relating to the IP address of the printing control system 10 also to the other equipments connected to the network.

According to the above-described second method, even when an IP address is randomly assigned to the printing control system 10, each multifunctional portable terminal 50 can easily find the printing control system 10. In addition, according to the above-described second method, it is not necessary to fix the IP address of the printing control system 10. Thus, when a laptop PC, which is generally connected to a network other than a network in an event hall, is used as the printing control system 10, an operation in which an IP address of the laptop PC is set for each time when an event is held, can be omitted.

Another Embodiment

In the above respective embodiments, images recorded in the received-image recording unit 35a of the recording device 35 of the printing control system 10 may be sequentially displayed like a slideshow, on the output device 14 of the printing control system 10 or on the output device 54 of each multifunctional portable terminal 50. In addition, a display device, which is configured to sequentially display, like a slideshow, images recorded in the received-image recording unit 35a, may be provided separately from the output device 14 of the printing control system 10 and the multifunctional portable terminal 50. As the display device, there may be used a liquid-crystal monitor or a projector that is communicably connected to the printing control system 10. In addition, a display device such as a personal computer or a tablet terminal communicably connected to the printing control system 10 may be disposed on each table in the event hall, so as to sequentially display, like a slideshow, images recorded in the received-image recording unit 35a. In addition, each participant may select a desired image using the personal computer or the tablet terminal disposed on each table, so that the selected image is printed by the printer 40. In this case, in order to perform the above restriction process and the composite-image forming process which are performed in a multifunctional portable terminal 50, the personal computer or the tablet terminal disposed on each table may include the aforementioned control device 60. The images sequentially displayed like a slideshow may be an image that is not yet combined with format information or a composite image in which the image and format information are combined with each other.

In addition, the printing control system 10 may be configured to be compatible with a conventional printing method. For example, a reading device for reading a recording medium, such as an SD card recording an image, may be connected to the printing control system 10. Thus, a participant who has a conventional digital camera not having a communication function can cause the printer 40 to print an image taken by this digital camera in the event hall.

In the above respective embodiments, there is described the example in which a laptop PC is used as the printing control system 10, and thus the printing control system 10 has the input device 13 and the output device 14. However, not limited thereto, a concrete structure of the printing control system 10 is not particularly limited, as long as the printing control system 10 can control the printer 40, as described in the above respective embodiments. For example, the printing control system 10 may not have the input device 13 and the output device 14. In this case, the printing control system 10 may be integrated with the wireless router 6 or the printer 40, or may be mounted on the wireless router 6 or the printer 40.

In the above respective embodiments, there is described the example in which designated information, which is set depending on a date and time at which the printing control system is operated, includes information relating to contents of an event. However, not limited thereto, the designated information may include various messages corresponding to kinds of events.

For example, the designated information may include a message that is displayed on the output device 54 of the multifunctional portable terminal 50 for each time when a printing process terminates. The message is suitably set depending on contents of an event. For example, a message of "Please receive a printed image, thank you" may be recorded as designated information in the designated-information recording unit 35c of the recording device 35.

In addition thereto, an alarming message of "Do NOT print image irrelevant to the event" may be recorded as designated information in the designated-information recording unit 35c of the recording device 35. Such an alarming message is displayed on the output device 54 of the multifunctional portable terminal 50, when the communication between the multifunctional portable terminal 50 and the printing control system 10 is established, for example.

In addition, in the above respective embodiments, there is described the example in which only one set of printing control system 10 and the printer 40 are included in the printing system 1 that is used in one event. However, not limited thereto, the plurality of printing control system 10 and the printers 40 may be used in one event. For example, a plurality of laptop PCs each serving as a printing server may present in the printing system 1. In this case, a control process that is the same as the printing control operation described in the above respective embodiments is performed as a whole system in which the plurality of printing severs are present.

Some embodiments of the present invention have been described. However, as a matter of course, a plurality of the embodiments may be suitably combined with each other.

What is claimed is:

1. A printing control system communicably connected to a multifunctional portable terminal, the printing control system being configured to generate a printing command to a printer, the printing control system comprising:
   a communication device configured to receive an image transmitted from the multifunctional portable terminal;
   a recording device configured to record the image received by the communication device as a received image; and
   a control device including a printing management unit capable of generating a printing command for causing the printer to print the received image;
   wherein the printing management unit of the control device is configured to exclude, when a creation date and time of the received image is out of a predetermined printable period, the received image from an item to be printed, or to exclude, when the number of received images is out of a predetermined printable number, at least a part of the received images, which exceeds the printable number, from an item to be printed,
   wherein the control device further includes a composite-image forming unit configured to form a composite image by combining the received image and predetermined format information with each other, and the composite image is transmitted to the printer, and
   wherein the composite-image forming unit includes a general-format-information management unit configured to manage general format information capable of being used regardless of a date and time at which the printing control system is operated, and the composite-image forming unit is capable of forming a composite image by combining the received image and the general format information.

2. The printing control system according to claim 1, wherein
   the printing management unit includes a printable-period setting unit configured to set the printable period, and
   the printing management unit is configured to exclude, when a creation date and time of the received image is out of the printable period of the printable-period setting unit, the received image from an item to be printed.

3. The printing control system according to claim 1, wherein
   the printing management unit includes a printable-number setting unit configured to set the printable number, and
   the printing management unit is configured to exclude, when the number of received images is out of the printable number of the printable-number setting unit, at least a part of the received images, which exceeds the printable number, from an item to be printed.

4. The printing control system according to claim 1, wherein
   the printing management unit includes an available-period setting unit configured to set an available period during which the printer can be used, and the printing management unit is configured to exclude, when a current time is out of the available period of the available-period setting unit, the received image from an item to be printed.

5. The printing control system according to claim 1, wherein
the printing management unit further includes a frequency-in-use information management unit configured to manage frequency-in-use information relating to a frequency at which the multifunctional portable terminal uses the printer, and a priority determination unit configured to determine ordering of priority in printing of images from multifunctional portable terminals depending on the frequency-in-use information.

6. The printing control system according to claim 5, wherein when the frequency-in-use information of the multifunctional portable terminal is out of a predetermined allowable frequency, the priority determination unit of the printing management unit is configured to lower the ordering of priority in printing of the received image from this multifunctional portable terminal.

7. The printing control system according to claim 5, wherein the priority determination unit of the printing management unit is configured to compare frequency-in-use information of a certain multifunctional portable terminal with frequency-in-use information of another multifunctional portable terminal, so as to determine ordering of priority in printing of received images from the respective multifunctional portable terminals.

8. The printing control system according to claim 1, wherein the control device further includes a processing-condition checking unit configured to obtain processing-condition information relating to a processing condition of the printer, and the processing-condition information is transmitted to the multifunctional portable terminal.

9. The printing control system according to claim 1, wherein the composite image is transmitted to a multifunctional portable terminal which has transmitted the received image based on which the composite image is formed.

10. The printing control system according to claim 1, wherein the control device further includes a shared-image management unit configured to set whether the received image that has been transmitted from a certain multifunctional portable terminal and is recorded in the recording device can be disclosed to another multifunctional portable terminal or not.

11. The printing control system according to claim 1, wherein the control device further includes a designated-information management unit configured to manage designated information that is set depending on a date and time at which the printing control system is operated, and the designated information is transmitted to the multifunctional portable terminal.

12. The printing control system according to claim 1, wherein the control device further includes a specific-information management unit configured to manage specific information that is transmitted from a certain multifunctional portable terminal and is received by the communication device, and the specific information is transmitted to another multifunctional portable terminal.

13. The printing control system according to claim 1, wherein the control device further includes a shared-information management unit configured to manage, as shared information, information peculiar to each multifunctional portable terminal, the information being transmitted from a multifunctional portable terminal whose sharing setup is in force among the multifunctional portable terminals, and configured to disclose the shared information to the multifunctional portable terminal whose sharing setup is in force.

14. A non-transitory computer readable storage medium with an executable program stored thereon for causing a computer to function as the communication device, the recording device and the control device of the printing control system according to claim 1.

15. A printing system comprising:
a printer; and
a printing control system communicably connected to a multifunctional portable terminal, the printing control system being configured to generate a printing command to the printer;
wherein the printing control system includes the printing control system according to claim 1.

16. The printing system according to claim 15, further comprising a display device communicably connected to the printing control system, the display device being configured to sequentially display received images recorded in the printing control system.

17. The printing system according to claim 16, wherein the display device is configured to cause the printer to print an image selected through the display device.

18. A printing control system communicably connected to a multifunctional portable terminal, the printing control system being configured to generate a printing command to a printer, the printing control system comprising:
a communication device configured to receive an image transmitted from the multifunctional portable terminal;
a recording device configured to record the image received by the communication device as a received image; and
a control device including a printing management unit capable of generating a printing command for causing the printer to print the received image;
wherein the printing management unit of the control device is configured to exclude, when a creation date and time of the received image is out of a predetermined printable period, the received image from an item to be printed, or to exclude, when the number of received images is out of a predetermined printable number, at least a part of the received images, which exceeds the printable number, from an item to be printed,
wherein the control device further includes a composite-image forming unit configured to form a composite image by combining the received image and predetermined format information with each other, and the composite image is transmitted to the printer, and
wherein the composite-image forming unit includes a designated-format-information management unit configured to manage designated format information that is set depending on a date and time at which the printing control system is operated, and the composite-image forming unit is capable of forming a composite image by combining the received image and the designated format information.

19. A printing control system communicably connected to a multifunctional portable terminal, the printing control system being configured to generate a printing command to a printer, the printing control system comprising:
a communication device configured to receive an image transmitted from the multifunctional portable terminal;
a recording device configured to record the image received by the communication device as a received image; and
a control device including a printing management unit capable of generating a printing command for causing the printer to print the received image;

wherein the printing management unit of the control device is configured to exclude, when a creation date and time of the received image is out of a predetermined printable period, the received image from an item to be printed, or to exclude, when the number of received images is out of a predetermined printable number, at least a part of the received images, which exceeds the printable number, from an item to be printed, wherein the control device further includes a composite-image forming unit configured to form a composite image by combining the received image and predetermined format information with each other, and the composite image is transmitted to the printer, and wherein the composite-image forming unit includes an optional-format-information management unit configured to manage optional format information that can be combined with the received image or the image, and the optional format information is disclosed to the multifunctional portable terminal and is transmitted thereto according to need.

20. A printing control system communicably connected to a multifunctional portable terminal, the printing control system being configured to generate a printing command to a printer, the printing control system comprising:

a communication device configured to receive an image transmitted from the multifunctional portable terminal;

a recording device configured to record the image received by the communication device as a received image; and a control device including a printing management unit capable of generating a printing command for causing the printer to print the received image;

wherein the printing management unit of the control device is configured to exclude, when a creation date and time of the received image is out of a predetermined printable period, the received image from an item to be printed, or to exclude, when the number of received images is out of a predetermined printable number, at least a part of the received images, which exceeds the printable number, from an item to be printed, wherein the control device further includes a designated-information management unit configured to manage designated information that is set depending on a date and time at which the printing control system is operated, and the designated information is transmitted to the multifunctional portable terminal, and wherein the designated-information management unit includes a time setting unit configured to set a time at which the designated information is transmitted to the multifunctional portable terminal.

* * * * *